(12) United States Patent
Kojima et al.

(10) Patent No.: US 12,057,751 B2
(45) Date of Patent: Aug. 6, 2024

(54) STATOR

(71) Applicant: SUBARU CORPORATION, Tokyo (JP)

(72) Inventors: Haruka Kojima, Tokyo (JP); Syouta Hosoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 17/379,171

(22) Filed: Jul. 19, 2021

(65) Prior Publication Data

US 2022/0085681 A1     Mar. 17, 2022

(30) Foreign Application Priority Data

Sep. 14, 2020    (JP) ................................. 2020-153456

(51) Int. Cl.
    *H02K 3/50*        (2006.01)
    *H02K 3/18*        (2006.01)
    (Continued)

(52) U.S. Cl.
    CPC .............. *H02K 3/505* (2013.01); *H02K 3/18* (2013.01); *H02K 3/28* (2013.01); *H02K 3/50* (2013.01);
    (Continued)

(58) Field of Classification Search
    CPC .. H02K 3/28; H02K 3/50; H02K 3/52; H02K 3/521; H02K 2203/09
    See application file for complete search history.

(56) References Cited

U.S. PATENT DOCUMENTS 9,954,408 B2 *   4/2018   Nakamura ............. H02K 3/522
2011/0018376 A1     1/2011   Kataoka et al.
(Continued)

FOREIGN PATENT DOCUMENTS

CN      210041484 U     2/2020
CN      112421838 A *   2/2021           H02K 3/04
(Continued)

OTHER PUBLICATIONS

Japanese Office Action 2019-174853 issued on May 30, 2023 with English translation thereof.
(Continued)

*Primary Examiner* — Ramon M Barrera
(74) *Attorney, Agent, or Firm* — MCGINN I.P. LAW GROUP, PLLC

(57) ABSTRACT

A stator for a rotary electric machine includes a stator core, a stator winding, a power bus bar, and a neutral bus bar. The stator core includes slots. The stator winding includes segment conductors inserted in the slots. The stator winding includes a power point and a neutral point. The power bus bar includes a bus bar end portion welded to a joint end portion of the segment conductor constituting the power point. The neutral bus bar includes a bus bar end portion welded to a joint end portion of the segment conductor constituting the neutral point. One or each of the respective bus bar end portions of the power bus bar and the neutral bus bar is located on an inner side of the joint end portion of the segment conductor to which the one or each of the bus bar end portions is welded.

20 Claims, 18 Drawing Sheets

(51) Int. Cl.
*H02K 3/28* (2006.01)
*H02K 3/52* (2006.01)
(52) U.S. Cl.
CPC ......... *H02K 3/522* (2013.01); *H02K 2203/09* (2013.01)

(56) References Cited

U.S. PATENT DOCUMENTS

| | | | | |
|---|---|---|---|---|
| 2021/0143699 | A1* | 5/2021 | Alsman | H02K 3/28 |
| 2021/0367473 | A1* | 11/2021 | Yoshimura | H02K 3/12 |
| 2023/0093398 | A1 | 3/2023 | Hongo | |

FOREIGN PATENT DOCUMENTS

| | | |
|---|---|---|
| EP | 3088124 A1 | 11/2016 |
| JP | S 49-013283 B | 3/1974 |
| JP | 2001-037132 A | 2/2001 |
| JP | 2005-341656 A | 12/2005 |
| JP | 2007-228708 A | 9/2007 |
| JP | 2008-136317 A | 6/2008 |
| JP | 2010-239741 A | 10/2010 |
| JP | 2014-036478 A | 2/2014 |
| JP | 2014-212638 A | 11/2014 |
| JP | 2016-013021 A | 1/2016 |
| JP | 2016-046867 A | 4/2016 |
| JP | 2017-005771 A | 1/2017 |
| JP | 2018-099010 A | 6/2018 |
| JP | 2018-126020 A | 8/2018 |
| JP | 2019-041440 A | 3/2019 |
| JP | 2021-137827 A | 9/2021 |
| WO | 2008/020471 A1 | 2/2008 |
| WO | 2009/113633 A1 | 9/2009 |
| WO | 2014/167668 A1 | 2/2016 |

OTHER PUBLICATIONS

Japanese Office Action 2020-153456 issued on Mar. 5, 2024 with English translation thereof.

* cited by examiner

FIG. 13
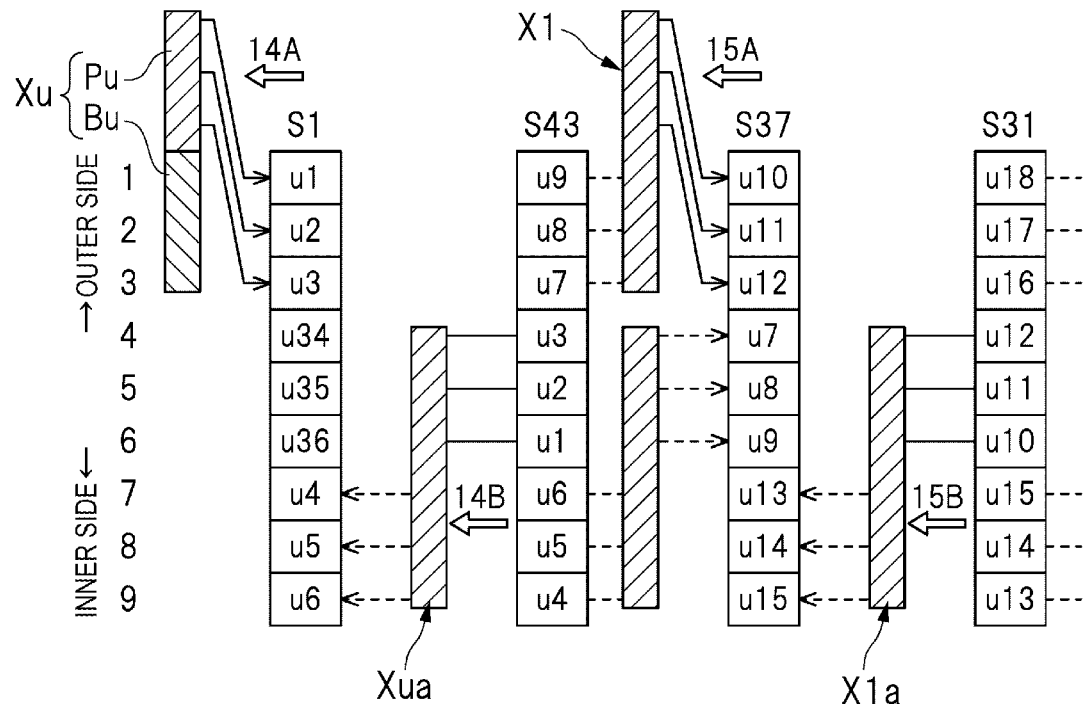
U PHASE: POWER-LINE SIDE
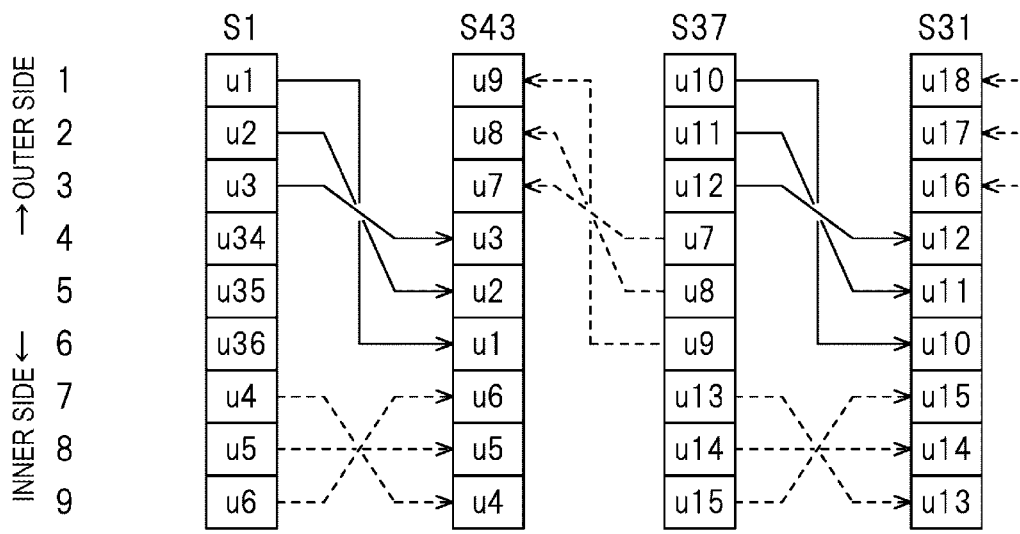
U PHASE: REVERSE POWER-LINE SIDE

EXAMPLE

EXAMPLE

EXAMPLE

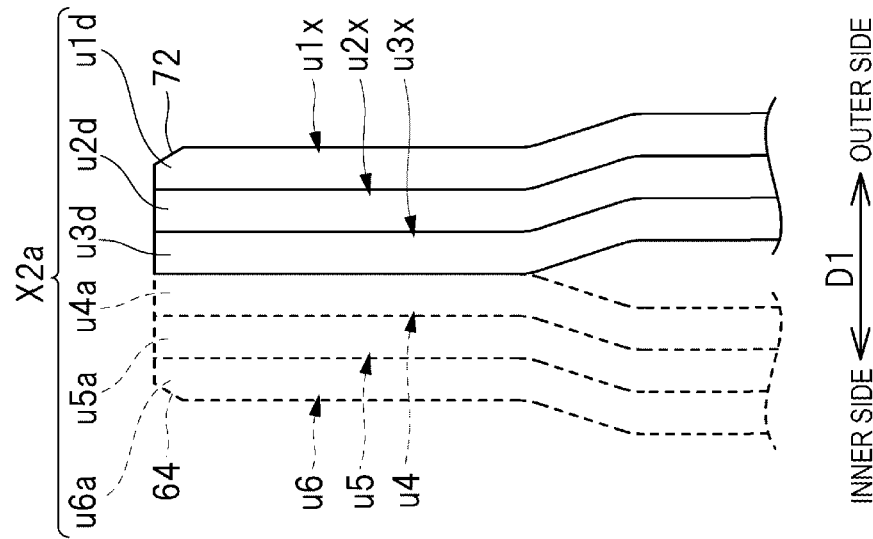
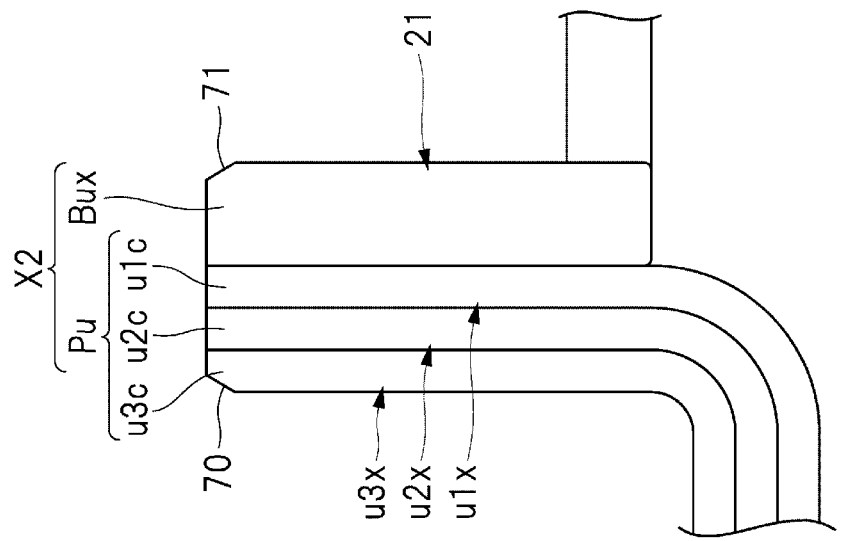

COMPARATIVE EXAMPLE

STATOR

CROSS-REFERENCE TO RELATED APPLICATIONS

The present application claims priority from Japanese Patent Application No. 2020-153456 filed on Sep. 14, 2020, the entire contents of which are hereby incorporated by reference.

BACKGROUND

The disclosure relates to a stator for a rotary electric machine.

A stator for a rotary electric machine, such as an electric motor and a generator, is wound with a stator coil. As such a stator coil, there is proposed a stator coil including plural segment conductors bent substantially in a U shape (see Japanese Unexamined Patent Application Publication (JP-A) No. 2016-46867, JP-A No. 2016-13021, and JP-A No. 2019-41440).

SUMMARY

An aspect of the disclosure provides a stator for a rotary electric machine. The stator includes a stator core, a stator winding, a power bus bar, and a neutral bus bar. The stator core has a hollow cylindrical shape and includes slots. The stator winding includes segment conductors inserted in the slots. The stator winding includes a power point and a neutral point that protrude from an end surface of the stator core. The power bus bar includes a bus bar end portion welded to a joint end portion of one of the segment conductors that constitutes the power point of the stator winding. The neutral bus bar includes a bus bar end portion welded to a joint end portion of one of the segment conductors that constitutes the neutral point of the stator winding. One or each of the bus bar end portion of the power bus bar and the bus bar end portion of the neutral bus bar is located on an inner side, in a radial direction of the stator core, of the joint end portion of one of the segment conductor to which the one or each of the bus bar end portion of the power bus bar and the bus bar end portion of the neutral bus bar is welded.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 13 is a diagram illustrating holding positions of the segment coils with respect to the slots.

FIG. 17A is a diagram illustrating a bus bar joint portion where first ends of segment coils are coupled. FIG. 17B is a diagram illustrating a conductor joint portion where second ends of the segment coils are coupled.

DETAILED DESCRIPTION

Generally, in manufacturing a stator coil using segment conductors, segment conductors of different lengths and having end portions of different shapes are combined. However, an increase in the number of kinds of the segment conductors that constitute the stator coil causes an increase in the cost of a stator. In view of this, the number of kinds of the segment conductors is decreased to reduce the cost of the stator.

It is desirable to reduce the cost of the stator.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, as an exemplary rotary electric machine 11 including a stator 10 according to an embodiment of the disclosure, a three-phase alternating current synchronous motor-generator mounted on an electric vehicle, a hybrid vehicle, and other vehicles will be given. However, this is not to be construed in a limiting sense. Any rotary electric machine may be applied insofar as the rotary electric machine includes the stator 10 where segment coils 40 are assembled.

Configuration of Rotary Electric Machine

Figure 1:
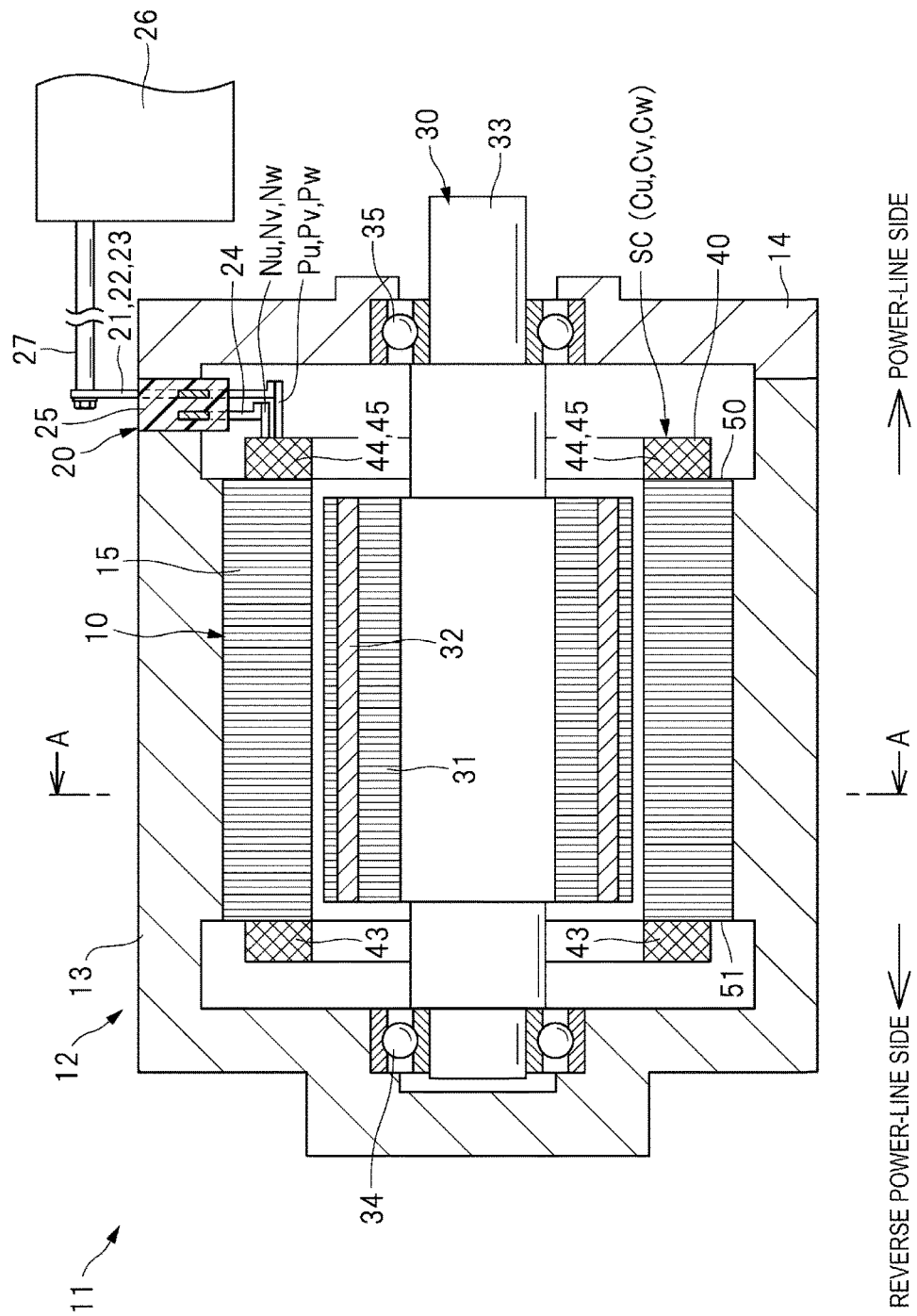
FIG. 1 is a cross-sectional view of an example of a rotary electric machine including a stator according to an embodiment of the disclosure.

FIG. 1 is a cross-sectional view of an example of the rotary electric machine 11 including the stator 10 according to the embodiment of the disclosure. As illustrated in FIG. 1, the rotary electric machine 11 is a motor-generator and includes a motor housing 12. The motor housing 12 includes a housing body 13 of a bottomed, hollow cylindrical shape, and an end cover 14 that closes an open end of the housing body 13. The stator 10 is secured in the housing body 13 and includes a stator core 15 of a hollow cylindrical shape including plural silicon steel sheets, for example, and a three-phase stator coil SC wound on the stator core 15. In one embodiment, the stator coil SC may serve as a "stator winding".

A bus bar unit 20 is coupled to the stator coil SC. This bus bar unit 20 includes three power bus bars 21 to 23 coupled to three power points Pu, Pv, and Pw of the stator coil SC, a neutral bus bar 24 that couples three neutral points Nu, Nv, and Nw of the stator coil SC to one another, and an insulating member 25 to hold these bus bars 21 to 24. End portions of the power bus bars 21 to 23 protrude outward from the motor housing 12, and a power cable 27 extending from an inverter 26, for example, is coupled to each of the power bus bars 21 to 23.

A rotor 30 of a solid cylindrical shape is rotatably accommodated in a center of the stator core 15. This rotor 30 includes a rotor core 31 of a hollow cylindrical shape including plural silicon steel sheets, for example, plural permanent magnets 32 buried in the rotor core 31, and a rotor shaft 33 secured in a center of the rotor core 31. One end of the rotor shaft 33 is supported by a bearing 34 disposed on the housing body 13, and the other end of the rotor shaft 33 is supported by a bearing 35 disposed on the end cover 14.

Configuration of Stator

Figure 2:
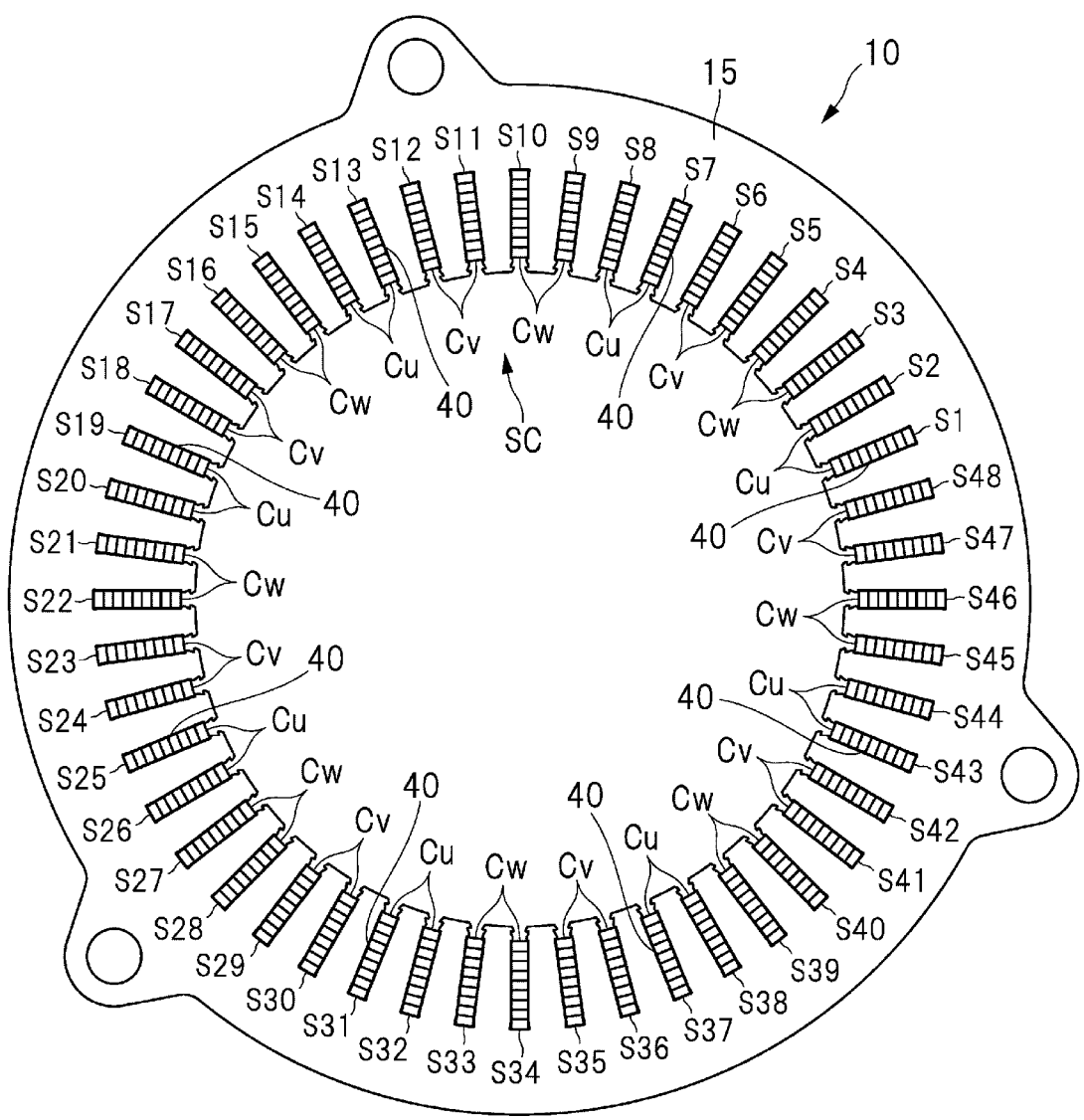
FIG. 2 is a cross-sectional view of the stator taken along line A-A in FIG. 1.
Figure 3:
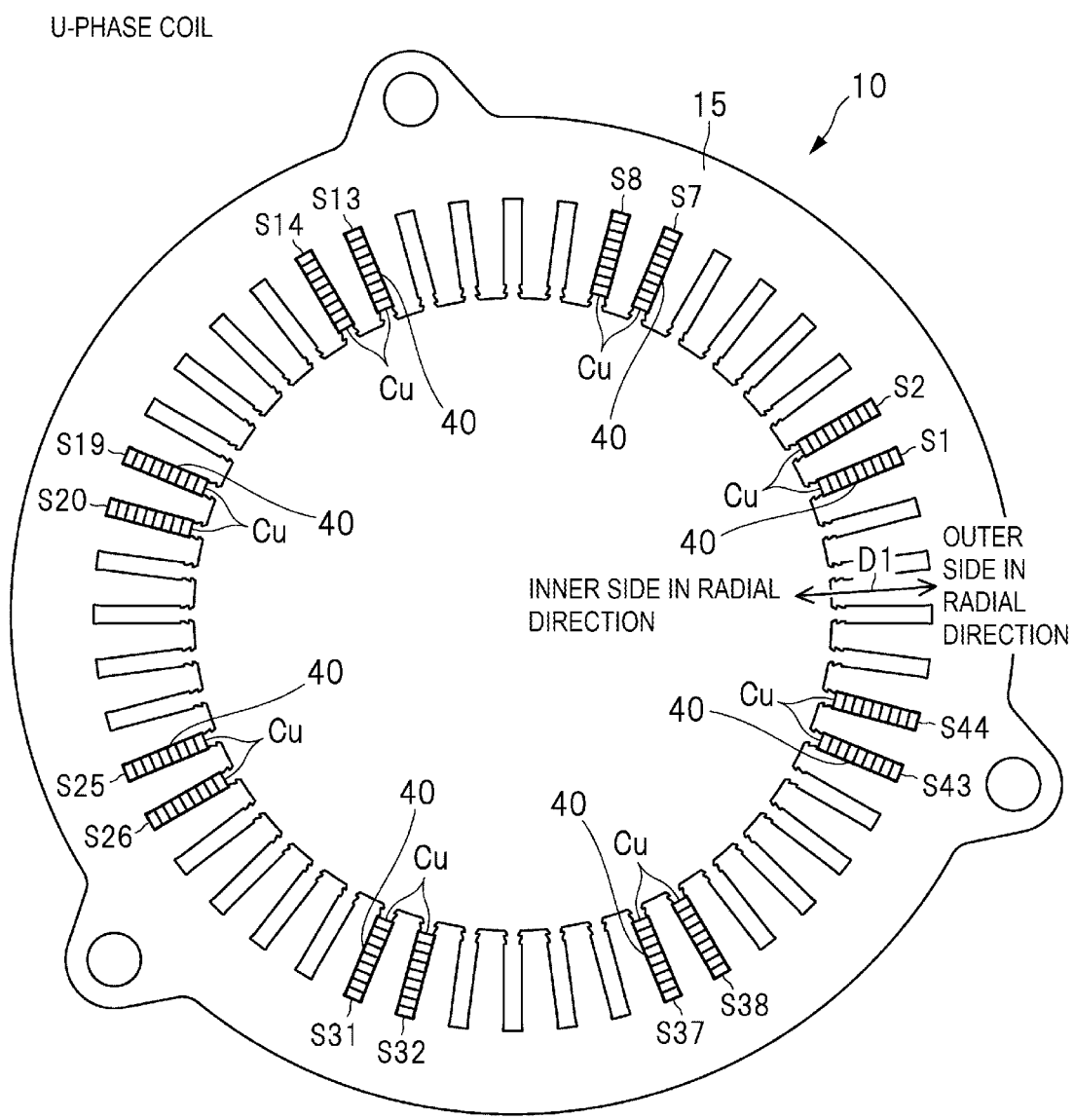
FIG. 3 is a cross-sectional view of a stator core including a U-phase coil.
Figure 4:
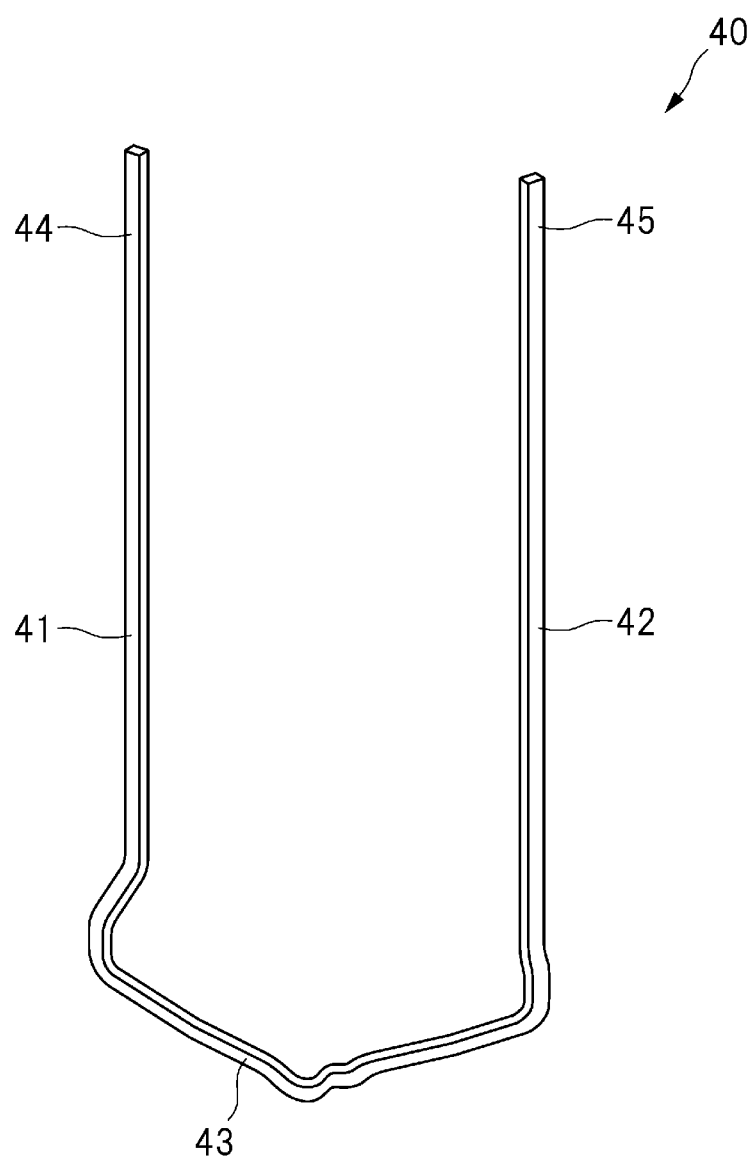
FIG. 4 is a perspective view of an exemplary segment coil.

FIG. 2 is a cross-sectional view of the stator 10 taken along line A-A in FIG. 1. FIG. 3 is a cross-sectional view of the stator core 15 including a phase winding of a U phase (hereinafter referred to as U-phase coil Cu). FIG. 4 is a perspective view of one of the segment coils 40 as an example. As described later, the stator coil SC includes a phase winding of a V phase (hereinafter referred to as V-phase coil Cv) and a phase winding of a W phase (hereinafter referred to as W-phase coil Cw) as well as the U-phase coil Cu. The U-phase coil Cu, the V-phase coil Cv, and the W-phase coil Cw in the drawings have an identical coil configuration, and are wound on the stator core 15 and have phases displaced from one another by 120°.

As illustrated in FIG. 2, plural slots S1 to S48 are formed in an inner-peripheral portion of the stator core 15 of the hollow cylindrical shape at predetermined intervals in a circumferential direction. The segment coils 40 are inserted in each of the slots S1 to S48. The plural segment coils 40 are coupled to one another to constitute the stator coil SC. In one embodiment, the segment coils 40 may serve as "segment conductors". As illustrated in FIGS. 2 and 3, the segment coils 40 that constitute the U-phase coil Cu are held in the slots S1, S2, S7, S8 . . . , the segment coils 40 that constitute the V-phase coil Cv are held in the slots S5, S6, S11, S12 . . . , and the segment coils 40 that constitute the W-phase coil Cw are held in the slots S3, S4, S9, S10 . . . .

As illustrated in FIG. 4, each of the segment coils 40 bent substantially in the U shape includes a coil side 41 held in one of the slots (e.g., the slot S1), and a coil side 42 held in another slot (e.g., the slot S7) at a predetermined coil pitch. The segment coil 40 also includes an end portion 43 that couples the pair of coil sides 41 and 42 to each other, and joint end portions 44 and 45 that respectively extend from the pair of coil sides 41 and 42. It is noted that the segment coil 40 is made of a rectangular wire of a conductive material such as copper, and that the segment coil 40 except distal ends of the joint end portions 44 and 45 is coated with an insulating film of enamel, resin or the like. The end portion 43 of the segment coil 40 is not limited to a bent shape illustrated in FIG. 4 but is bent in various shapes in accordance with an assembling position with respect to the stator core 15.

Figure 5:
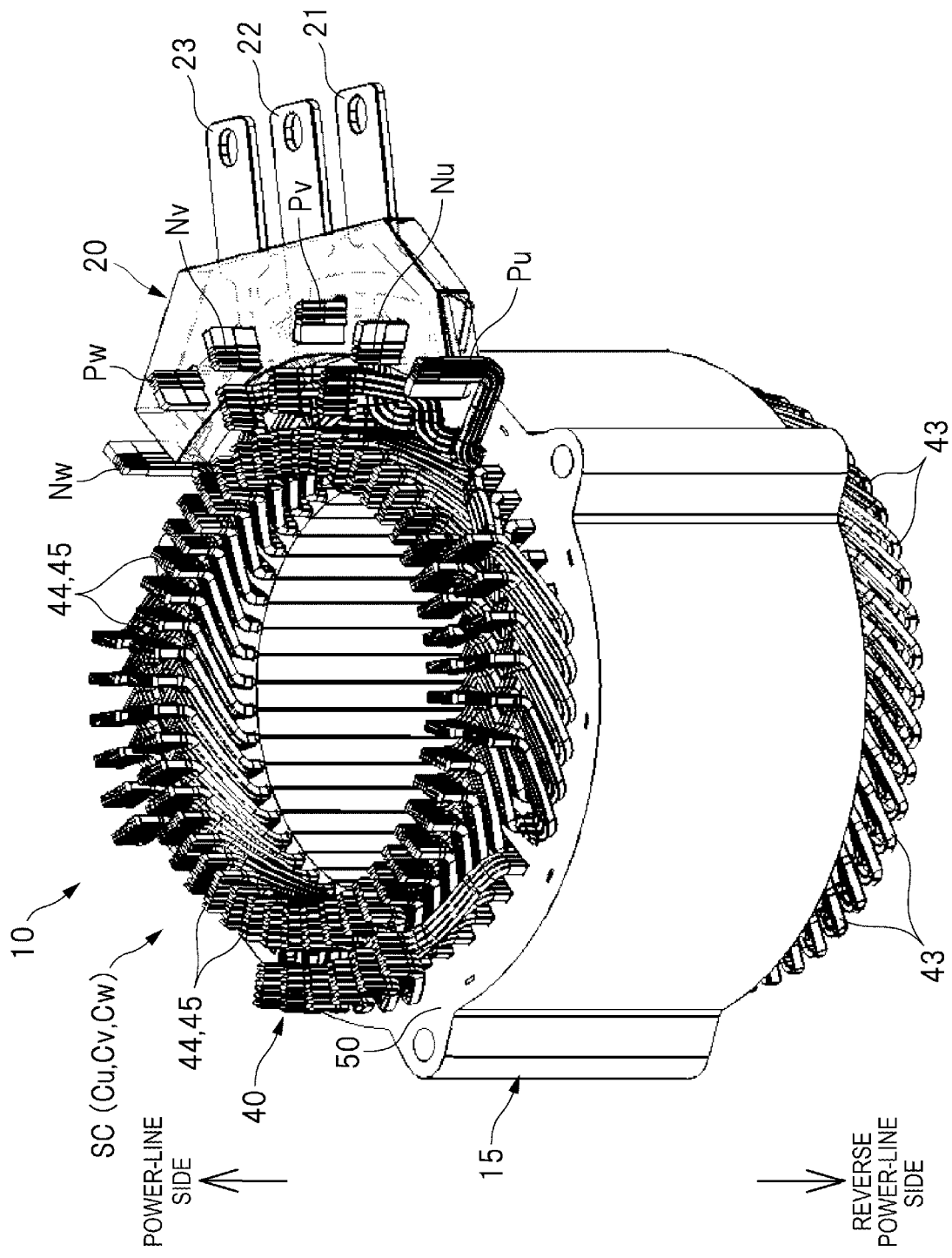
FIG. 5 is a perspective view of the stator as viewed from a power-line side.
Figure 6:
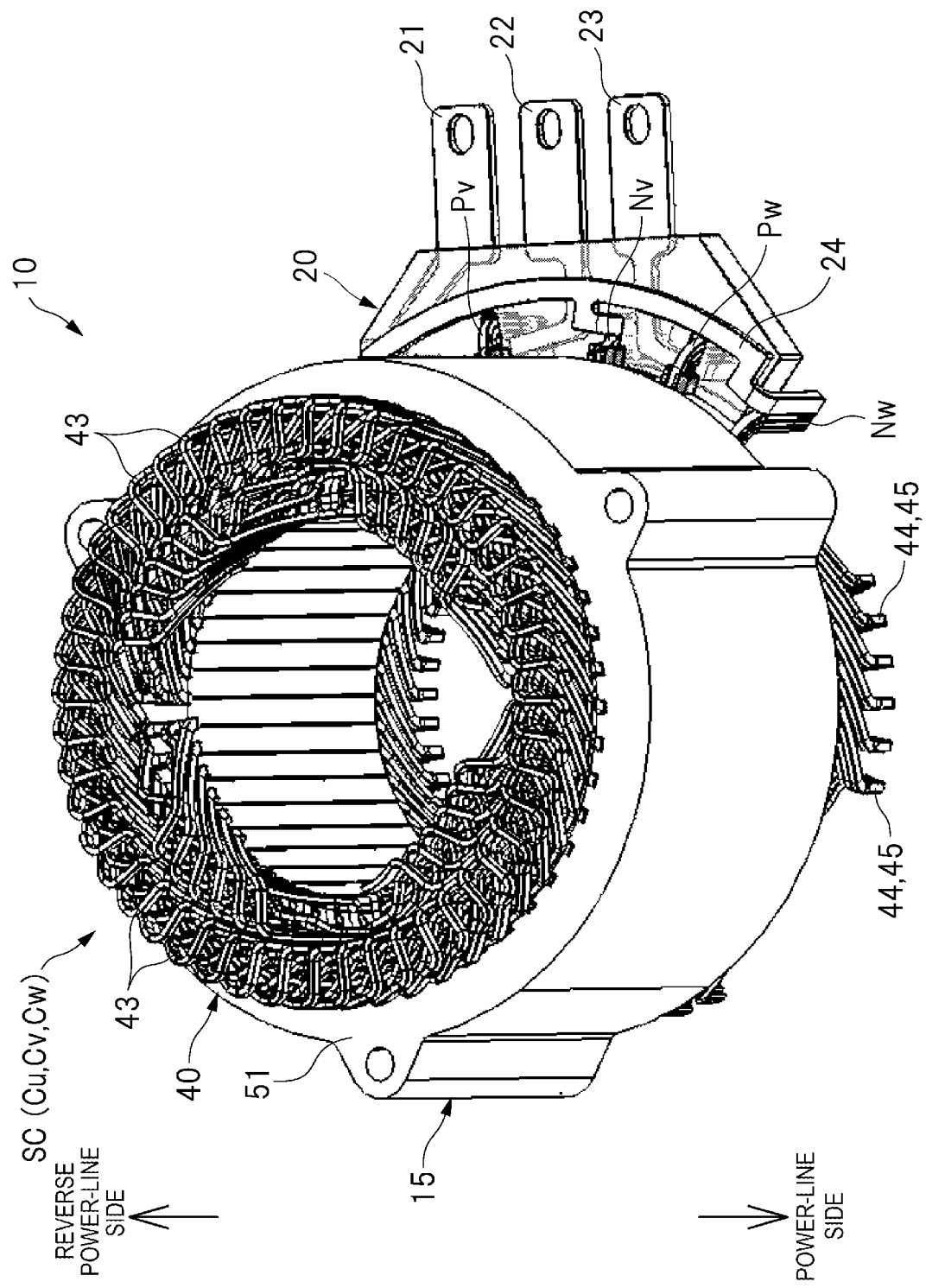
FIG. 6 is a perspective view of the stator as viewed from a reverse power-line side.
Figure 7A:
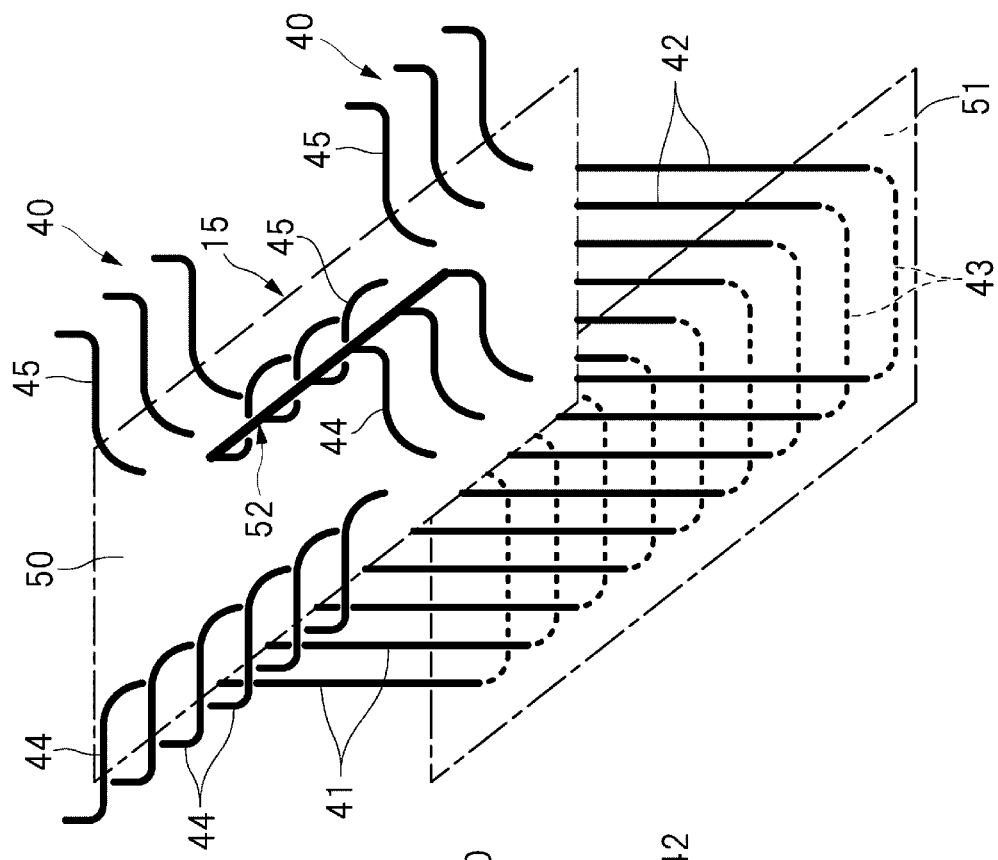
FIGS. 7A and 7B are diagrams illustrating an example of a coupling state of the segment coils.
Figure 7B:
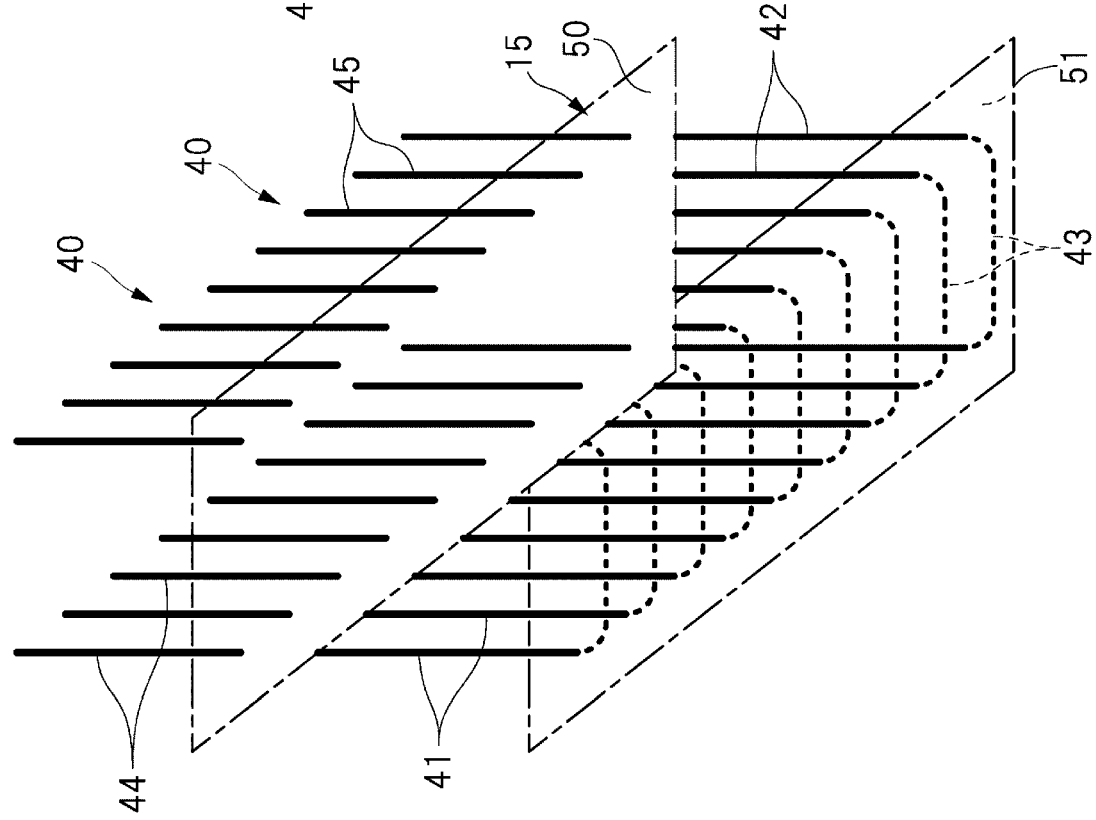

FIG. 5 is a perspective view of the stator 10 as viewed from a power-line side. FIG. 6 is a perspective view of the stator 10 as viewed from a reverse power-line side. It is noted that the power-line side is a side where the bus bar unit 20 is disposed. FIGS. 7A and 7B are diagrams illustrating an example of a coupling state of the segment coils 40. As described above, the plural segment coils 40 are assembled in each of the slots S1 to S48 of the stator core 15. When the segment coils 40 are thus assembled with the stator core 15, as illustrated in FIGS. 5 to 7B, the joint end portions 44 and 45 of the segment coils 40 protrude from one end surface 50 of the stator core 15 to the power-line side, and the end portions 43 of the segment coils 40 protrude from the other end surface 51 of the stator core 15 to the reverse power-line side. In one embodiment, the one end surface 50 may serve as an "end surface".

As illustrated in FIGS. 7A and 7B, the joint end portions 44 and 45 that protrude from the one end surface 50 of the stator core 15 are bent to come into contact with the joint end portions 44 and 45 of other segment coils 40 and thereafter welded to the joint end portions 44 and 45 of the other segment coils 40 in contact. Thus, the joint end portions 44 and 45 of the segment coils 40 are welded to one another into conductor joint portions 52, and the plural segment coils 40 are coupled to one another into a single conductor. That is, the plural segment coils 40 constitute the U-phase coil Cu, the plural segment coils 40 constitute the V-phase coil Cv, and the plural segment coils 40 constitute the W-phase coil Cw. It is noted that the joint end portions 44 and 45 after welded undergo insulating processing to form a resin film, for example, to coat the conductor.

Configuration of Stator Coil

Figure 8:
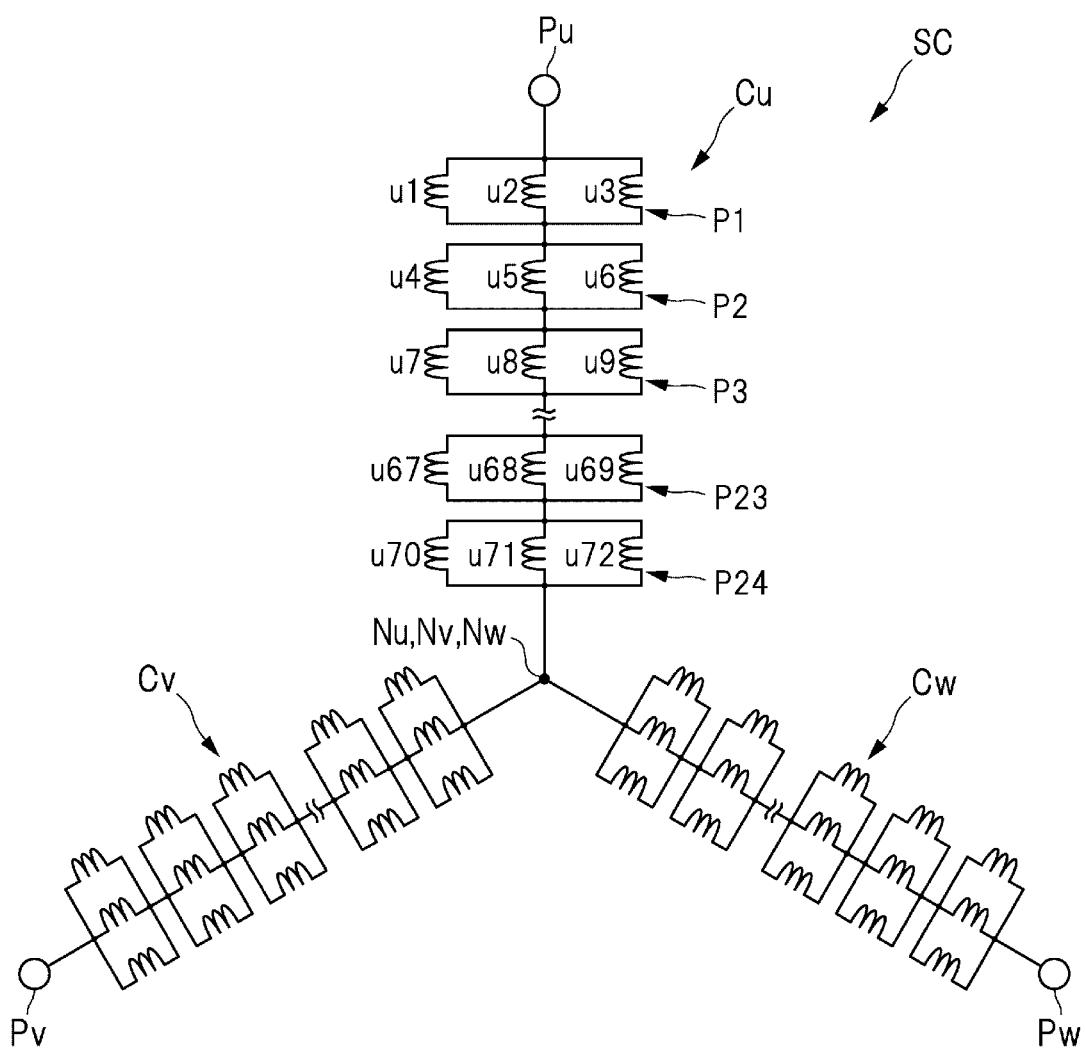
FIG. 8 is a diagram illustrating an example of a connection state of a stator coil.

FIG. 8 is a diagram illustrating an example of a connection state of the stator coil SC. It is noted that although the segment coils are denoted by a reference symbol "40" in the preceding description, the segment coils that constitute the U-phase coil Cu will be denoted by reference symbols "u1 to u72" in the following description in order to discriminate the individual segment coils. The U-phase coil Cu will now be mainly described. As described above, each of the phase coils Cu, Cv, and Cw has the identical coil configuration.

As illustrated in FIG. 8, the U-phase coil Cu, the V-phase coil Cv, and the W-phase coil Cw constitute the stator coil SC. The U-phase coil Cu includes plural parallel coils P1 to P24 connected to one another in series. Each of the parallel coils P1 to P24 includes three segment coils connected to one another in parallel. For example, the parallel coil P1 includes segment coils u1 to u3, the parallel coil P2 includes segment coils u4 to u6, and the parallel coil P3 includes segment coils u7 to u9. The parallel coil P23 includes segment coils u67 to u69, and the parallel coil P24 includes segment coils u70 to u72. One end of the U-phase coil Cu serves as a power point Pu, and the other end of the U-phase coil Cu serves as a neutral point Nu.

Similarly, the V-phase coil Cv includes the plural parallel coils connected to one another in series. One end of the V-phase coil Cv serves as a power point Pv, and the other end of the V-phase coil Cv serves as a neutral point Nv. The W-phase coil Cw includes the plural parallel coils connected to one another in series. One end of the W-phase coil Cw serves as a power point Pw, and the other end of the W-phase coil Cw serves as a neutral point Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Configuration of U-Phase Coil

Figure 9:
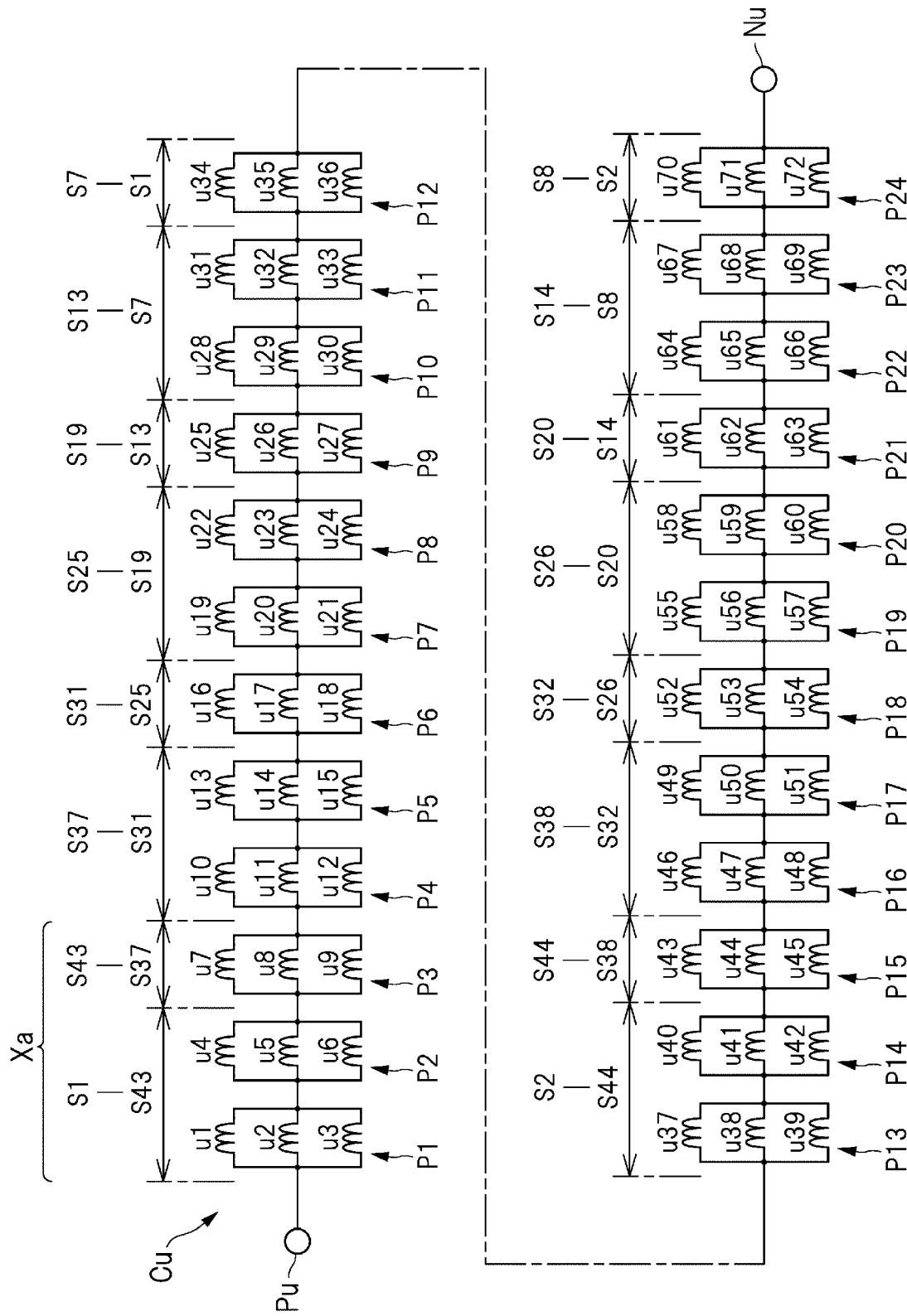
FIG. 9 is a diagram illustrating an example of a coil configuration of the U-phase coil.
Figure 10:
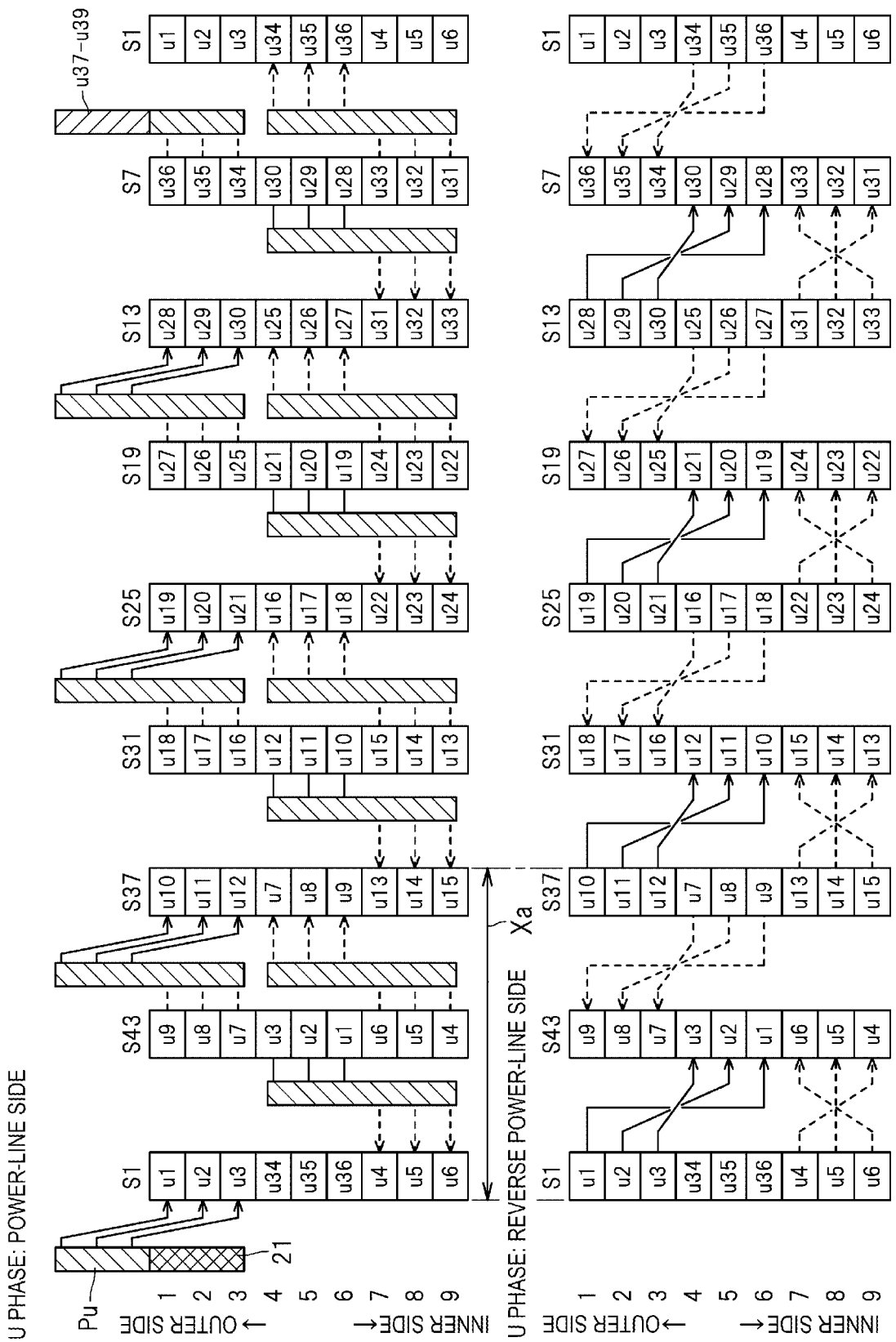
FIG. 10 is a diagram illustrating holding positions of the segment coils that constitute the U-phase coil with respect to slots.
Figure 11:
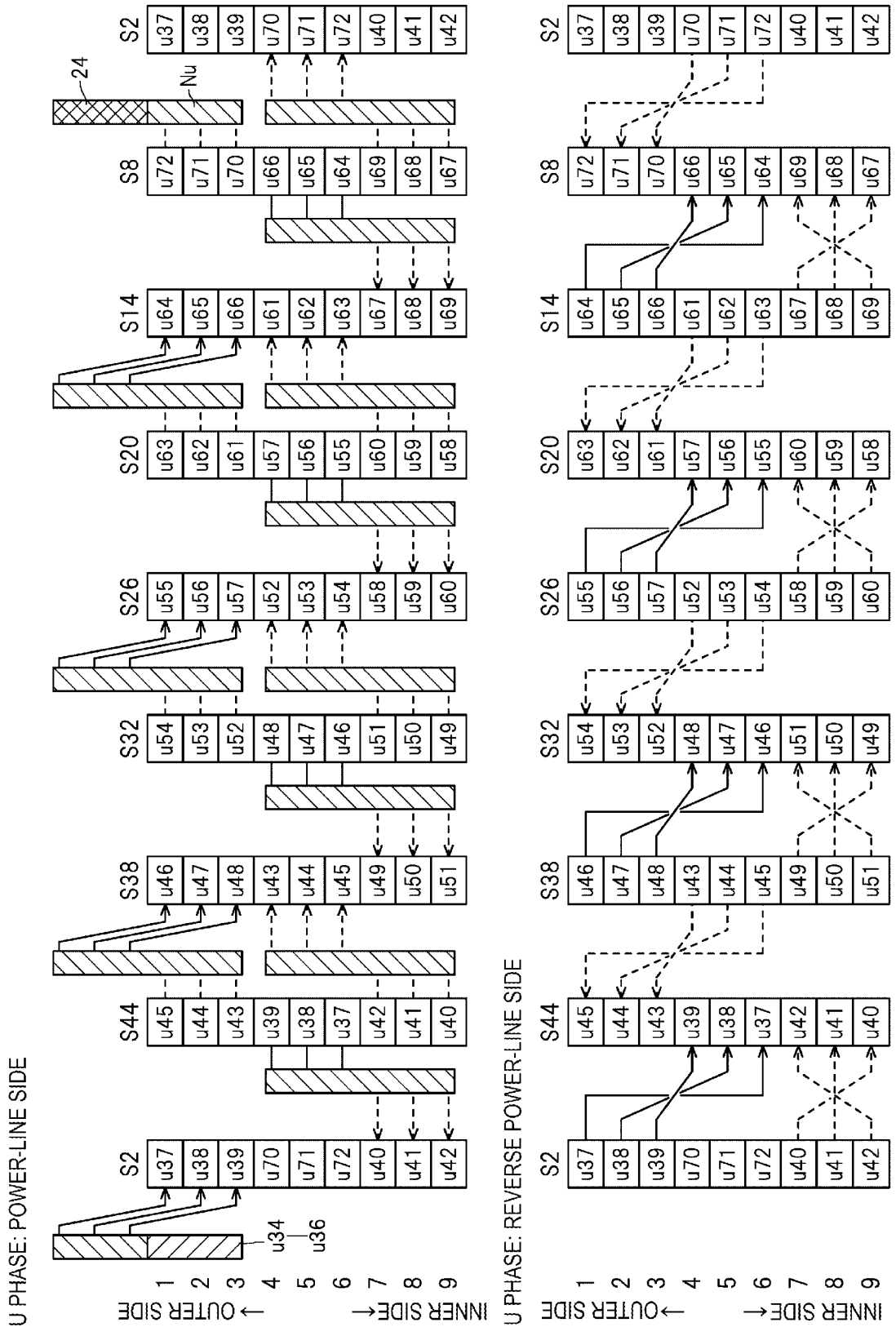
FIG. 11 is a diagram illustrating holding positions of the segment coils that constitute the U-phase coil with respect to slots.

FIG. 9 is a diagram illustrating an example of the coil configuration of the U-phase coil Cu. Slot numbers in FIG. 9 indicate slots where the segment coils u1 to u72 are held. FIGS. 10 and 11 are diagrams illustrating holding positions of the segment coils u1 to u72 that constitute the U-phase coil Cu with respect to the slots S1, S2, S7, S8 . . . . FIG. 10 illustrates holding positions of the segment coils u1 to u36, and FIG. 11 illustrates holding positions of the segment coils u37 to u72.

The "power-line side" illustrated in FIGS. 10 and 11 refers to a side where the joint end portions 44 and 45 of the segment coils 40 are located, that is, a side where the bus bar unit 20 is located as illustrated in FIGS. 1 and 5. The "reverse power-line side" illustrated in FIGS. 10 and 11 refers to a side opposite to the power-line side, that is, a side where the end portions 43 of the segment coils 40 are located as illustrated in FIGS. 1 and 6. As illustrated in FIG. 3, an "inner side" illustrated in FIGS. 10 and 11 refers to an inner side of the stator core 15 in the radial direction, and an "outer side" illustrated in FIGS. 10 and 11 refers to an outer side of the stator core 15 in the radial direction. Shadowed portions in FIGS. 10 and 11 indicate weld portions of the segment coils u1 to u72.

As illustrated in FIG. 9, the U-phase coil Cu has a coil configuration where a connection pattern of three parallel coils (e.g., P1 to P3, P4 to P6, P7 to P9, . . . ) is repeated, that is, a coil configuration where a connection pattern of nine segment coils (e.g., u1 to u9, u10 to u18, u19 to u27, . . . ) is repeated. A connection pattern of the segment coils u1 to u9 will now be described as indicated by reference symbol Xa in FIG. 9.

As illustrated in FIG. 10, the segment coil u1 is held in a first position (an outer position) of the slot S1 and a sixth position of the slot S43. The segment coil u2 is held in a second position of the slot S1 and a fifth position of the slot S43. The segment coil u3 is held in a third position of the slot S1 and a fourth position of the slot S43. The segment coil u4 is held in a seventh position of the slot S1 and a ninth position of the slot S43. The segment coil u5 is held in an eighth position of the slot S1 and an eighth position of the slot S43. The segment coil u6 is held in a ninth position of the slot S1 and a seventh position of the slot S43. The segment coil u7 is held in a third position of the slot S43 and a fourth position of the slot S37. The segment coil u8 is held in a second position of the slot S43 and a fifth position of the slot S37. The segment coil u9 is held in a first position of the slot S43 and a sixth position of the slot S37.

Between the slots S1 and S43 on the power-line side, the segment coils u1 to u3 that extend from the slot S43 and the segment coils u4 to u6 that extend from the slot S1 are welded to each other. Between the slots S37 and S43, the segment coils u4 to u6 that extend from the slot S43 and the segment coils u7 to u9 that extend from the slot S37 are welded to each other. It is noted that the power bus bar 21, described later, is welded to the segment coils u1 to u3 that extend from the slot S1, and the segment coils u10 to u12 that constitute a next connection pattern are welded to the segment coils u7 to u9 that extend from the slot S43. Such a connection pattern is repeated to connect the segment coils u1 to u72. Thus, as illustrated in FIGS. 9 to 11, the segment coils u1 to u72 constitute the U-phase coil Cu.

Configuration of Bus Bar Unit

Figure 12:
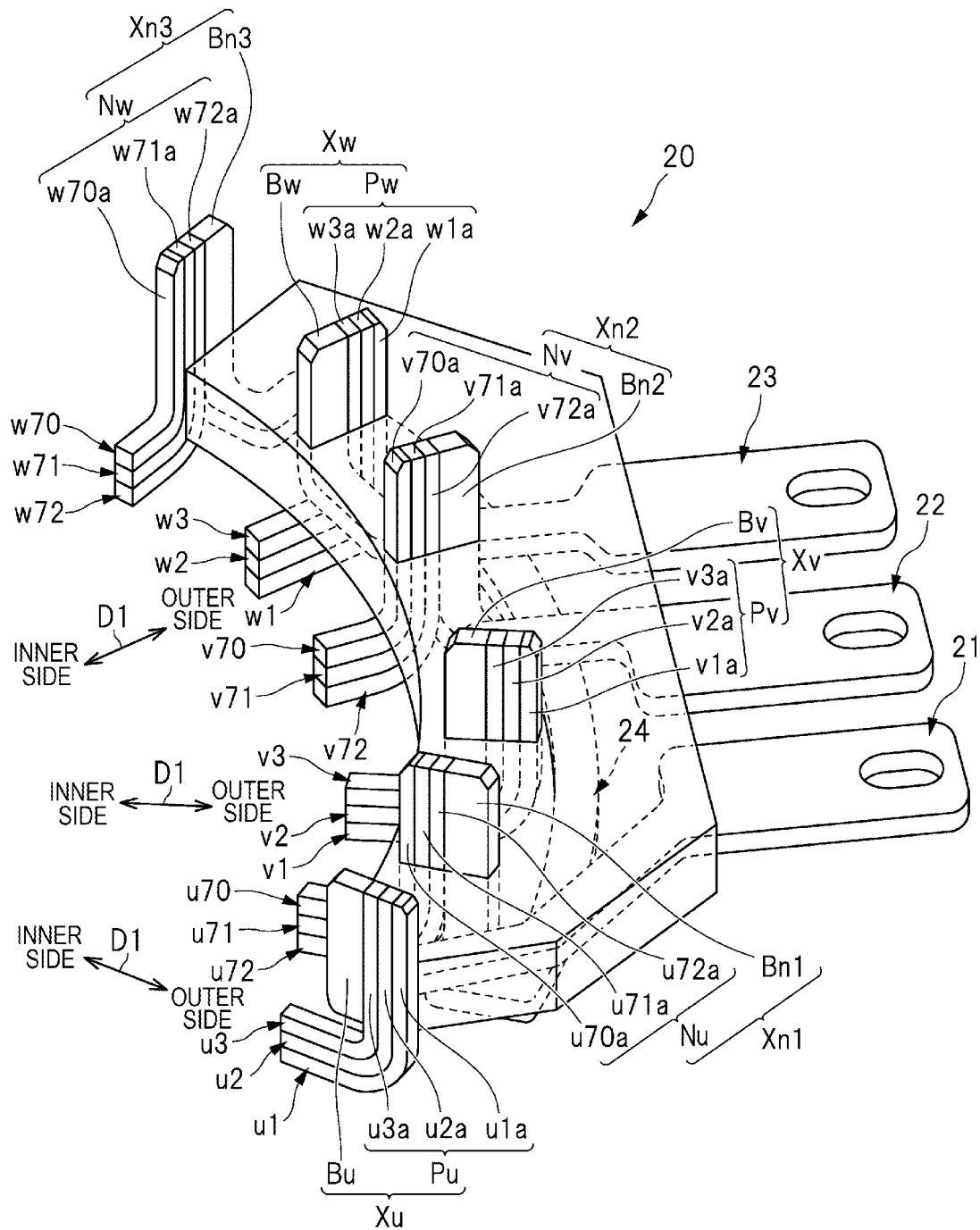
FIG. 12 is a perspective view of a bus bar unit, illustrating an internal configuration thereof.

The bus bar unit 20 coupled to the stator coil SC will be described. FIG. 12 is a perspective view of the bus bar unit 20, illustrating an internal configuration thereof. As illustrated in FIG. 12, the bus bar unit 20 includes the three power bus bars 21 to 23 made of a conductive material such as copper, and the single neutral bus bar 24 made of a metal material such as copper. The power bus bars 21 to 23 incorporated in the bus bar unit 20 include the first power bus bar 21 coupled to the power point Pu of the U-phase coil, the second power bus bar 22 coupled to the power point Pv of the V-phase coil, and the third power bus bar 23 coupled to the power point Pw of the W-phase coil. In one embodiment, the U-phase coil Cu may serve as a "first phase winding", the V-phase coil Cv may serve as a "second phase winding", and the W-phase coil Cw may serve as a "third phase winding".

The power point Pu of the U-phase coil Cu includes joint end portions u1a to u3a of the segment coils u1 to u3. A bus bar end portion Bu extending from the first power bus bar 21 is welded to the joint end portions u1a to u3a that constitute the power point Pu. In one embodiment, the bus bar end portion Bu may serve as a "first bus bar end portion". The power point Pv of the V-phase coil Cv includes joint end portions v1a to v3a of segment coils v1 to v3. A bus bar end portion Bv extending from the second power bus bar 22 is welded to the joint end portions v1a to v3a that constitute the power point Pv. In one embodiment, the bus bar end portion Bv may serve as a "second bus bar end portion". The power point Pw of the W-phase coil Cw includes joint end portions w1a to w3a of segment coils w1 to w3. A bus bar end portion Bw extending from the third power bus bar 23 is welded to the joint end portions w1a to w3a that constitute the power point Pw. In one embodiment, the bus bar end portion Bw may serve as a "third bus bar end portion".

The bus bar unit 20 includes the neutral bus bar 24 coupled to the neutral points Nu, Nv, and Nw of the respective phase coils Cu, Cv, and Cw. The neutral point Nu of the U-phase coil Cu includes joint end portions u70a to u72a of the segment coils u70 to u72. A bus bar end portion Bn1 extending from the neutral bus bar 24 is welded to the joint end portions u70a to u72a that constitute the neutral point Nu. In one embodiment, the bus bar end portion Bn1 may serve as a "fourth bus bar end portion". The neutral point Nv of the V-phase coil Cv includes joint end portions v70a to v72a of segment coils v70 to v72. A bus bar end portion Bn2 extending from the neutral bus bar 24 is welded to the joint end portions v70a to v72a that constitute the neutral point Nv. In one embodiment, the bus bar end portion Bn2 may serve as a "fifth bus bar end portion". The neutral point Nw of the W-phase coil Cw includes joint end portions w70a to w72a of segment coils w70 to w72. A bus bar end portion Bn3 extending from the neutral bus bar 24 is welded to the joint end portions w70a to w72a that constitute the neutral point Nw. In one embodiment, the bus bar end portion Bn3 may serve as a "sixth bus bar end portion".

Increased Commonality of Segment Coils

Next, description will be made on increased commonality of the segment coils welded to the bus bar end portions Bu, Bv, and Bw of the power bus bars 21 to 23 with other segment coils. As illustrated in FIG. 12, the bus bar end portion Bu of the first power bus bar 21 is located on an inner side of the joint end portions u1a to u3a that constitute the power point Pu of the U-phase coil Cu in a radial direction D1 of the stator core 15. That is, in a bus bar joint portion Xu including the bus bar end portion Bu and the joint end portions u1a to u3a, the bus bar end portion Bu is located closer to a rotation axis of the rotor 30 than the joint end portions u1a to u3a are to the rotation axis of the rotor 30.

The bus bar end portion By of the second power bus bar 22 is located on an inner side of the joint end portions v1a to v3a that constitute the power point Pv of the V-phase coil Cv in the radial direction D1 of the stator core 15. That is, in a bus bar joint portion Xv including the bus bar end portion By and the joint end portions v1a to v3a, the bus bar end portion Bv is located closer to the rotation axis of the rotor 30 than the joint end portions v1a to v3a are to the rotation axis of the rotor 30. Similarly, the bus bar end portion Bw of the third power bus bar 23 is located on an inner side of the joint end portions w1a to w3a that constitute the power point Pw of the W-phase coil Cw in the radial direction D1 of the stator core 15. That is, in a bus bar joint portion Xw including the bus bar end portion Bw and the joint end portions w1a to w3a, the bus bar end portion Bw is located closer to the rotation axis of the rotor 30 than the joint end portions w1a to w3a are to the rotation axis of the rotor 30.

In this manner, the bus bar end portion Bu is disposed on an inner side, in the radial direction D1, of the joint end portions u1a to u3a to which the bus bar end portion Bu is welded, the bus bar end portion By is disposed on an inner side, in the radial direction D1, of the joint end portions v1a to v3a to which the bus bar end portion By is welded, and the bus bar end portion Bw is disposed on an inner side, in the radial direction D1, of the joint end portions w1a to w3a to which the bus bar end portion Bw is welded. With this arrangement and configuration of the bus bar end portions Bu, Bv, and Bw, commonality of the segment coils can be promoted to decrease the number of kinds of the segment coils as described later.

Figure 14B:
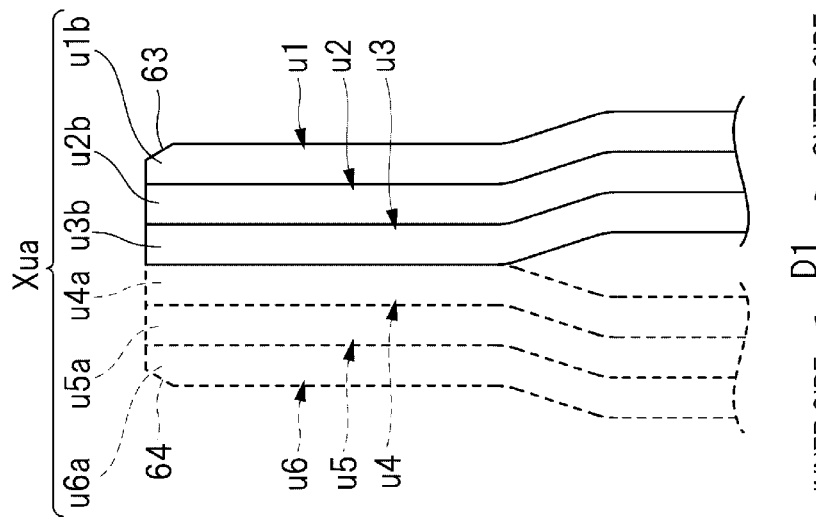
FIG. 14B is a diagram illustrating a conductor joint portion from a direction indicated with arrow 14B in FIG. 13.
Figure 14A:
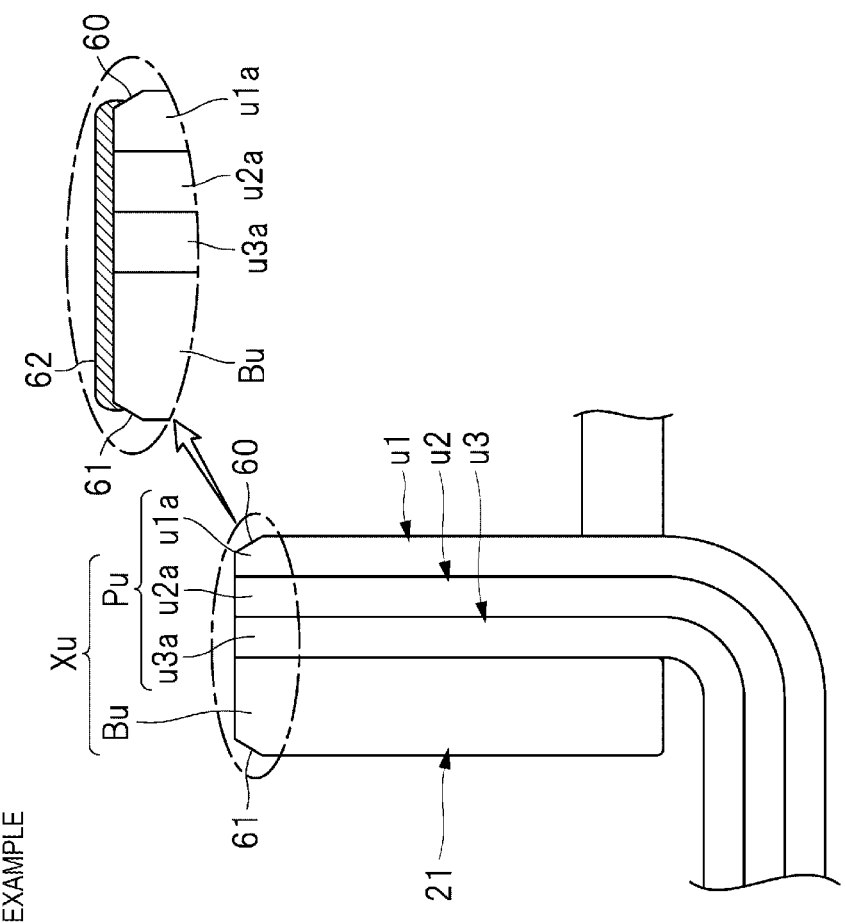
FIG. 14A is a diagram illustrating a bus bar joint portion from a direction indicated with arrow 14A in FIG. 13.
Figure 15A:
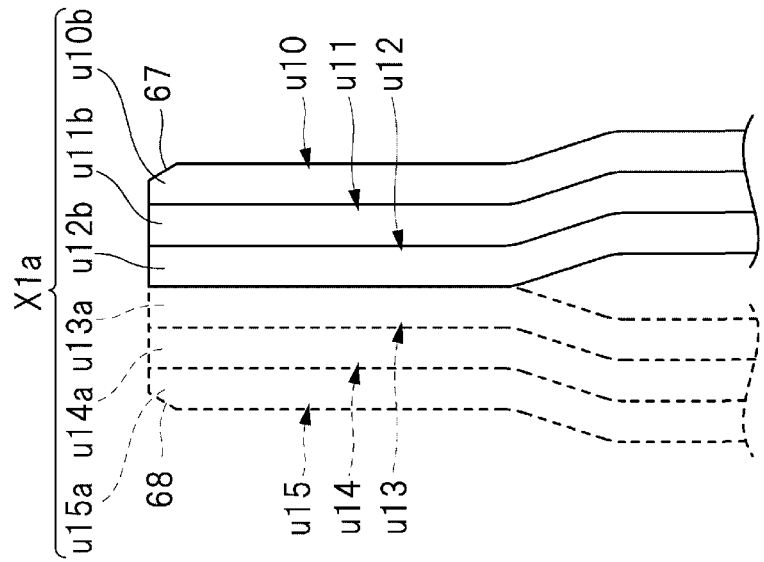
FIG. 15A is a diagram illustrating a conductor joint portion from a direction indicated with arrow 15A in FIG. 13.
Figure 15B:
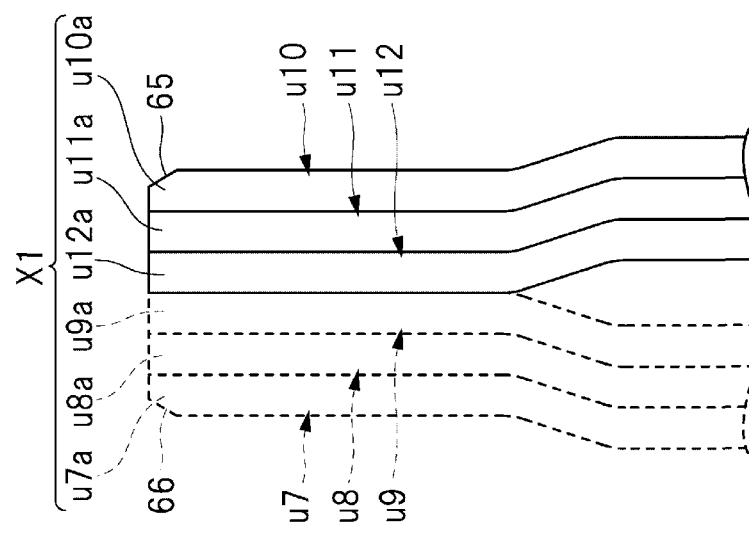
FIG. 15B is a diagram illustrating a conductor joint portion from a direction indicated with arrow 15B in FIG. 13.

FIG. 13 is a diagram illustrating holding positions of the segment coils u1 to u18 with respect to the slots S1, S43, S37, and S31, and is an enlarged partial view of FIG. 10. FIG. 14A is a diagram illustrating the bus bar joint portion Xu from a direction indicated with arrow 14A in FIG. 13. FIG. 14B is a diagram illustrating a conductor joint portion Xua from a direction indicated with arrow 14B in FIG. 13. FIG. 15A is a diagram illustrating a conductor joint portion X1 from a direction indicated with arrow 15A in FIG. 13. FIG. 15B is a diagram illustrating a conductor joint portion X1a from a direction indicated with arrow 15B in FIG. 13. That is, FIG. 14A illustrates the joint end portions u1a to u3a on first ends of the segment coils u1 to u3, and FIG. 14B illustrates joint end portions u1b to u3b on second ends of the segment coils u1 to u3. FIG. 15A illustrates joint end portions u10a to u12a on first ends of the segment coils u10 to u12, and FIG. 15B illustrates joint end portions u10b to u12b on second ends of the segment coils u10 to u12.

As illustrated in FIGS. 13 and 14A, a distal end of the bus bar joint portion Xu is chamfered to form inclined surfaces 60 and 61 on corners of the bus bar joint portion Xu. That is, the inclined surface 60 is formed on the joint end portion u1a of the segment coil u1, and the inclined surface 61 is formed on the bus bar end portion Bu. As illustrated in an enlarged portion in FIG. 14A, the distal end of the bus bar joint portion Xu is welded in such a manner that a welding mark 62 such as a penetration portion is formed on the distal end of the bus bar joint portion Xu. Since the inclined surfaces 60 and 61 are thus formed on the bus bar joint portion Xu, molten metal at the time of welding can be released to the inclined surfaces 60 and 61 to prevent the molten metal from excessively protruding. It is noted that the distal end of the bus bar joint portion Xu undergoes welding such as TIG welding.

As illustrated in FIGS. 13 and 14B, the conductor joint portion Xua includes the joint end portions u1b to u3b of the segment coils u1 to u3 and joint end portions u4a to u6a of the segment coils u4 to u6. In a manner similar to the above-described bus bar joint portion Xu, a distal end of the conductor joint portion Xua is chamfered to form inclined surfaces 63 and 64 on corners of the conductor joint portion Xua. That is, the inclined surface 63 is formed on the joint end portion u1b of the segment coil u1, and the inclined surface 64 is formed on the joint end portion u6a of the segment coil u6.

As illustrated in FIGS. 13 and 15A, the conductor joint portion X1 includes the joint end portions u10a to u12a of the segment coils u10 to u12 and joint end portions u7a to u9a of the segment coils u7 to u9. In a manner similar to the above-described bus bar joint portion Xu, a distal end of the conductor joint portion X1 is chamfered to form inclined surfaces 65 and 66 on corners of the conductor joint portion X1. That is, the inclined surface 65 is formed on the joint end portion u10a of the segment coil u10, and the inclined surface 66 is formed on the joint end portion u7a of the segment coil u7.

As illustrated in FIGS. 13 and 15B, the conductor joint portion X1a includes the joint end portions u10b to u12b of the segment coils u10 to u12 and joint end portions u13a to u15a of the segment coils u13 to u15. In a manner similar to the above-described bus bar joint portion Xu, a distal end of the conductor joint portion X1a is chamfered to form inclined surfaces 67 and 68 on corners of the conductor joint portion X1a. That is, the inclined surface 67 is formed on the joint end portion u10b of the segment coil u10, and the inclined surface 68 is formed on the joint end portion u15a of the segment coil u15.

Figure 16B:
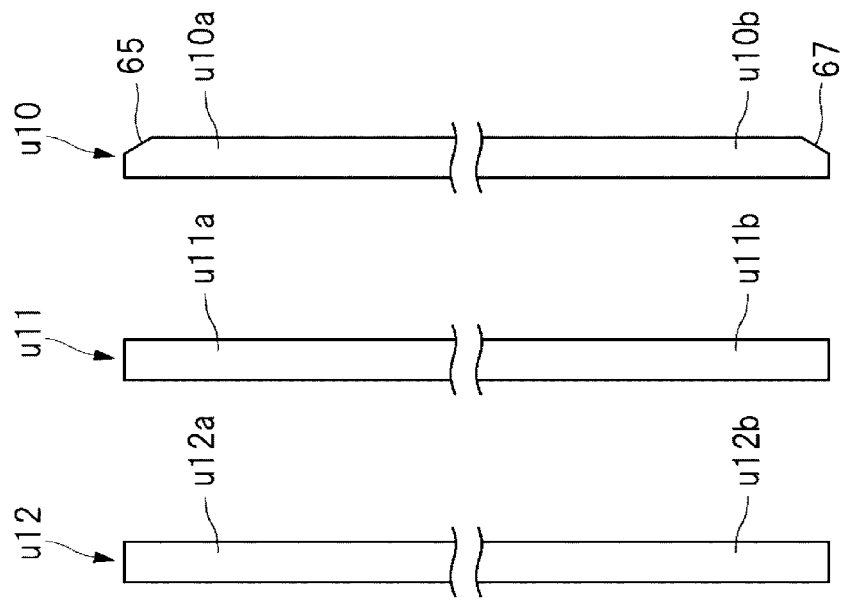
FIG. 16B is a diagram illustrating the segment coils prior to bending.
Figure 16A:
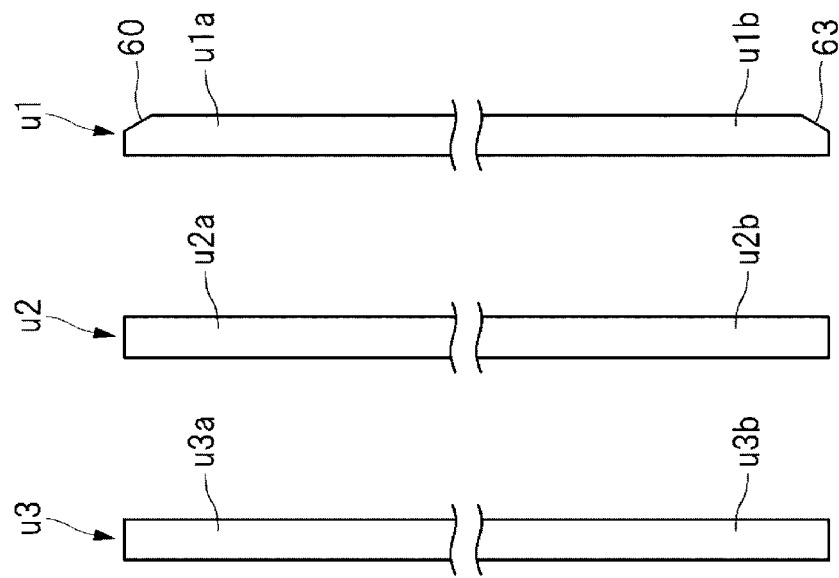
FIG. 16A is a diagram illustrating the segment coils prior to bending.

FIG. 16A is a diagram illustrating the segment coils u1 to u3 prior to bending, and FIG. 16B is a diagram illustrating the segment coils u10 to u12 prior to bending. As described above, the bus bar end portion Bu is disposed on an inner side of the joint end portions u1a to u3a in the radial direction D1. Thus, as illustrated in FIGS. 16A and 16B, material shapes of the segment coils u1 to u3 and material shapes of the segment coils u10 to u12 can be made to coincide with each other. In other words, the segment coils u1 and u10 can be made of a common material with the inclined surfaces 60 and 63 (65 and 67) formed on opposite ends, the segment coils u2 and u11 can be made of a common material with no inclined surfaces, and the segment coils u3 and u12 can be made of a common material with no inclined surfaces. With this configuration, the number of kinds of the segment coils can be decreased to reduce the cost of the stator 10.

It is noted that although increased commonality of the materials for the segment coils u1 to u3 and u10 to u12 has been described so far, the segment coils indicated with solid lines in FIGS. 10 and 11 can be also made of the materials in common with the segment coils u1 to u3. That is, the common material with the inclined surfaces on opposite ends can be used to make the segment coils u1, u10, u19, u28, u37, u46, u55, and u64. The common material with no inclined surfaces can be used to make the segment coils u2, u11, u20, u29, u38, u47, u56, and u65. The common material with no inclined surfaces can be used to make the segment coils u3, u12, u21, u30, u39, u48, u57, and u66. It is noted that in a manner similar to the U-phase coil Cu, the segment coils that constitute the V-phase coil Cv and the W-phase coil Cw can be also made of the common materials.

Comparative Example

As described above, the bus bar end portion Bu is disposed on an inner side of the joint end portions u1a to u3a in the radial direction D1 so that the material shapes of the segment coils u1 to u3 and the material shapes of the segment coils u10 to u12 can be made to coincide with each other. As a comparative example, description will now be made on a case where the bus bar end portion Bu is disposed on an outer side of the joint end portions u1a to u3a in the radial direction D1. In the following description, segment coils u1x to u3x corresponding to the above-described segment coils u1 to u3 will be given as the comparative example, and material shapes of the segment coils u1x to u3x will be described.

Figure 18B:
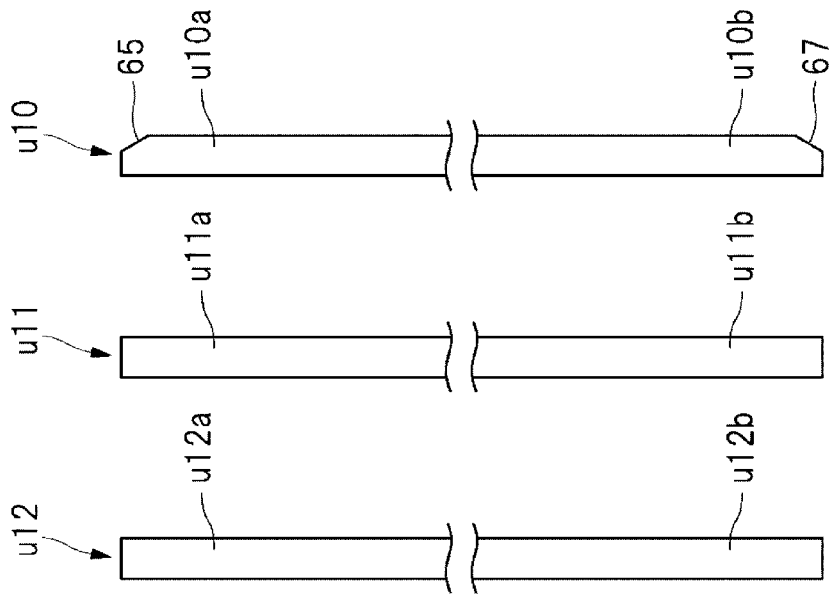
FIG. 18B is a diagram illustrating the segment coils prior to bending.
Figure 18A:
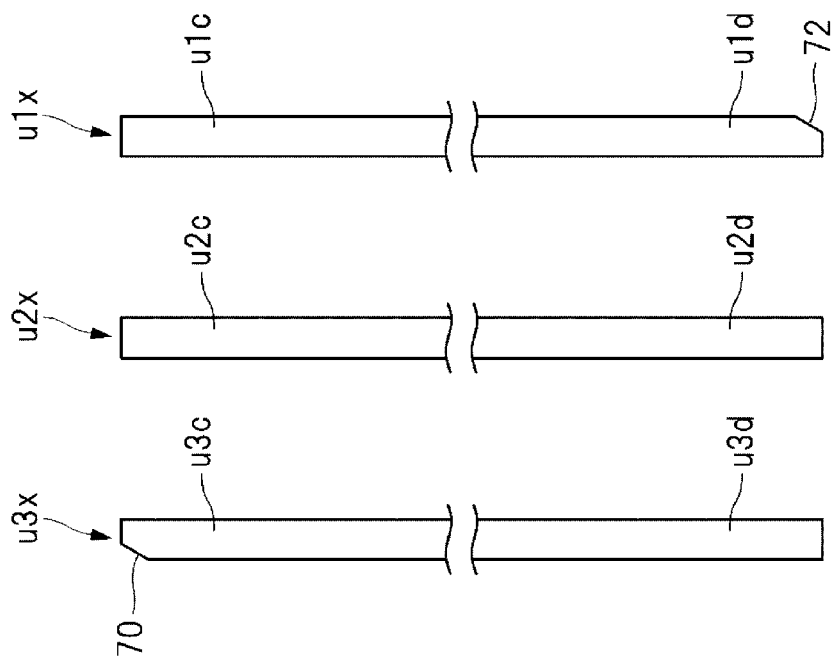
FIG. 18A is a diagram illustrating the segment coils prior to bending.

FIG. 17A is a diagram illustrating a bus bar joint portion X2 where first ends of the segment coils u1x to u3x of the comparative example are coupled. FIG. 17B is a diagram illustrating a conductor joint portion X2a where second ends of the segment coils u1x to u3x of the comparative example are coupled. It is noted that in FIGS. 17A and 17B, substantially the same components as those illustrated in FIGS. 14A and 14B are denoted with identical reference symbols and will not be repeatedly elaborated. FIG. 18A is a diagram illustrating the segment coils u1x to u3x prior to bending, and FIG. 18B is a diagram illustrating the segment coils u10 to u12 prior to bending. It is noted that the segment coils u10 to u12 in FIG. 18B are identical with the segment coils u10 to u12 in FIG. 16B above.

As illustrated in FIG. 17A, the bus bar joint portion X2 includes joint end portions u1c to u3c of the segment coils u1x and u3x that constitute the power point Pu of the U-phase coil Cu, and a bus bar end portion Bux of the first power bus bar 21 welded to the joint end portions u1c to u3c. The bus bar end portion Bux is located on an outer side, in the radial direction D1 of the stator core 15, of the joint end portions u1c to u3c to which the bus bar end portion Bux is welded. A distal end of the bus bar joint portion X2 is chamfered to form inclined surfaces 70 and 71 on corners of the bus bar joint portion X2. That is, the inclined surface 70 is formed on the joint end portion u3c of the segment coil u3x, and the inclined surface 71 is formed on the bus bar end portion Bux.

As illustrated in FIG. 17B, the conductor joint portion X2a includes joint end portions u1d to u3d on the second ends of the segment coils u1x to u3x and the joint end portions u4a to u6a of the segment coils u4 to u6 described above. A distal end of the conductor joint portion X2a is chamfered to form inclined surfaces 72 and 64 on corners of the conductor joint portion X2a. That is, the inclined surface 72 is formed on the joint end portion u1d of the segment coil u1x, and the inclined surface 64 is formed on the joint end portion u6a of the segment coil u6.

When the bus bar end portion Bux is disposed on an outer side in the radial direction as described with reference to FIG. 17A, it is impossible to make material shapes of the segment coils u1x to u3x and the material shapes of the segment coils u10 to u12 coincide with each other as illustrated in FIGS. 18A and 18B. In one example, a material of the segment coil u1x is a material with the inclined surface 72 on the joint end portion u1d on the first end whereas the material of the above-described segment coil u10 is a material with the inclined surfaces 65 and 67 on the joint end portions u10a and u10b on opposite ends. That is, in manufacturing the segment coils u1x and u10, two kinds of materials having end portions of different shapes are provided. A material of the segment coil u3x is a material with the inclined surface 70 on the joint end portion u3c on the first end whereas the material of the above-described segment coil u12 is a material with no inclined surfaces on the joint end portions u12a and u12b on opposite ends. That is, in manufacturing the segment coils u3x and u12, two kinds of materials having end portions of different shapes are provided. Thus, in a coil configuration of the comparative example, the number of kinds of the segment coils is increased to make it difficult to reduce the cost of the stator.

Needless to say, the disclosure is not limited to the foregoing embodiments, and various modifications can be made thereto within the scope that does not depart from the gist thereof. In the description above, the plural segment coils are connected in parallel to form the parallel coils, and the parallel coils are connected in series to constitute each of the phase coils Cu, Cv, and Cw. However, this is not to be construed in a limiting sense. For example, the plural segment coils may be connected in series to constitute each of the phase coils Cu, Cv, and Cw. That is, even when the bus bar joint portion includes the single bus bar end portion and the single joint end portion, the bus bar end portion is disposed on an inner side of the joint end portion in the radial direction D1 so as to decrease the number of kinds of the segment coils.

In the foregoing description, the bus bar end portions Bu, Bv, and Bw of the power bus bars 21 to 23 are disposed on an inner side of the joint end portions u1a to u3a, v1a to v3a, and w1a to w3a in the radial direction D1 whereas the bus bar end portions Bn1 to Bn3 of the neutral bus bar 24 are disposed on an outer side of joint end portions u70a to u72a, v70a to v72a, and w70a to w72a in the radial direction D1. This is not to be construed in a limiting sense. That is, at least one of the bus bar end portions Bu, Bv, Bw, Bn1, Bn2 or Bn3 is disposed on an inner side, in the radial direction D1, of the joint end portions to which the at least one of the bus bar end portions Bu, Bv, Bw, Bn1, Bn2 or Bn3 is welded, so as to decrease the number of kinds of the segment coils.

For example, one of the bus bar end portions Bu, Bv, and Bw of the power bus bars 21 to 23 may be disposed on an inner side, in the radial direction D1, of the joint end portions to which the one of the bus bar end portions Bu, Bv, and Bw of the power bus bars 21 to 23 is welded, and one of the bus bar end portions Bn1 to Bn3 of the neutral bus bar 24 may be disposed on an inner side, in the radial direction D1, of the joint end portions to which the one of the bus bar end portions Bn1 to Bn3 of the neutral bus bar 24 is welded. Alternatively, all of the bus bar end portions Bu, Bv, Bw, Bn1, Bn2, and Bn3 may be disposed on an inner side, in the radial direction D1, of the joint end portions to which all of the bus bar end portions Bu, Bv, Bw, Bn1, Bn2, and Bn3 are welded. While all of the bus bar end portions Bn1, Bn2, and Bn3 are disposed on an inner side, in the radial direction D1, of the joint end portions to which all of the bus bar end portions Bn1, Bn2, and Bn3 are welded, all of the bus bar end portions Bu, Bv, and Bw may be disposed on an outer side, in the radial direction D1, of the joint end portions to which all of the bus bar end portions Bu, Bv, and Bw are welded.

In the foregoing description, the inclined surfaces are formed on the bus bar joint portions and the conductor joint portions. However, this is not to be construed in a limiting sense. Other configurations may be adopted to release molten metal at the time of welding. It is noted that although in the foregoing description, the bus bar joint portions and the conductor joint portions are welded by arc welding such as TIG welding, this is not to be construed in a limiting sense. Laser welding, for example, may be adopted to weld the bus bar joint portions and the conductor joint portions.

According to the embodiment of the disclosure, at least one of the bus bar end portion of the power bus bars or the bus bar end portion of the neutral bus bar is located on an inner side, in the radial direction of the stator core, of the joint end portions of the segment conductors to which the at least one of the bus bar end portion of the power bus bars or the bus bar end portion of the neutral bus bar is welded. With this configuration, the number of kinds of the segment conductors can be decreased to reduce the cost of the stator.

The invention claimed is:

1. A stator for a rotary electric machine, the stator comprising:
   a stator core having a hollow cylindrical shape, the stator core including slots;
   a stator winding comprising segment conductors inserted in the slots, the stator winding comprising a power point and a neutral point that protrude from an end surface of the stator core;
   a power bus bar comprising a bus bar end portion welded to a joint end portion of one of the segment conductors, including an inclined surface on a corner of bus bar joint portion comprising the bus bar end portion of the power bus bar and the joint end portion to which the bus bar end portion of the power bus bar is welded, that constitutes the power point of the stator winding; and
   a neutral bus bar comprising a bus bar end portion welded to a joint end portion of one of the segment conductors that constitutes the neutral point of the stator winding, wherein
   one or each of the bus bar end portion of the power bus bar and the bus bar end portion of the neutral bus bar is located on an inner side, in a radial direction of the stator core, of the joint end portion of one of the segment conductors to which the one or each of the bus bar end portion of the power bus bar and the bus bar end portion of the neutral bus bar is welded.

2. The stator according to claim 1, wherein welding marks are formed on respective distal ends of bus bar joint portions, the bus bar joint portions respectively comprising the bus bar end portion of the power bus bar and the joint end portion to which the bus bar end portion of the power bus bar is welded, and the bus bar end portion of the neutral bus bar and the joint end portion to which the bus bar end portion of the neutral bus bar is welded.

3. The stator according to claim 1,
   wherein the stator winding comprises
      a first phase winding comprising segment conductors inserted in the slots, the first phase winding comprising a power point and a neutral point that protrude from the end surface of the stator core,
      a second phase winding comprising segment conductors inserted in the slots, the second phase winding comprising a power point and a neutral point that protrude from the end surface of the stator core, and
      a third phase winding comprising segment conductors inserted in the slots, the third phase winding comprising a power point and a neutral point that protrude from the end surface of the stator core,
   wherein the power bus bar comprises
      a first power bus bar comprising a first bus bar end portion welded to a joint end portion of one of the segment conductors that constitutes the power point of the first phase winding,
      a second power bus bar comprising a second bus bar end portion welded to a joint end portion of one of the segment conductors that constitutes the power point of the second phase winding, and
      a third power bus bar comprising a third bus bar end portion welded to a joint end portion of one of the segment conductors that constitutes the power point of the third phase winding,
   wherein the bus bar end portion of the neutral bus bar comprises
      a fourth bus bar end portion welded to a joint end portion of one of the segment conductors that constitutes the neutral point of the first phase winding,
      a fifth bus bar end portion welded to a joint end portion of one of the segment conductors that constitutes the neutral point of the second phase winding, and
      a sixth bus bar end portion welded to a joint end portion of one of the segment conductors that constitutes the neutral point of the third phase winding, and
   wherein one or more of the first bus bar end portion, the second bus bar end portion, the third bus bar end portion, the fourth bus bar end portion, the fifth bus bar end portion and the sixth bus bar end portion are located on an inner side, in the radial direction of the stator core, of the joint end portion of the segment conductor to which the one or more of the first bus bar end portion, the second bus bar end portion, the third bus bar end portion, the fourth bus bar end portion, the fifth bus bar end portion and the sixth bus bar end portion are welded.

4. The stator according to claim 2,
   wherein the stator winding comprises
      a first phase winding comprising segment conductors inserted in the slots, the first phase winding comprising a power point and a neutral point that protrude from the end surface of the stator core,
      a second phase winding comprising segment conductors inserted in the slots, the second phase winding comprising a power point and a neutral point that protrude from the end surface of the stator core, and
      a third phase winding comprising segment conductors inserted in the slots, the third phase winding comprising a power point and a neutral point that protrude from the end surface of the stator core,
   wherein the power bus bar comprises
      a first power bus bar comprising a first bus bar end portion welded to a joint end portion of one of the segment conductors that constitutes the power point of the first phase winding,
      a second power bus bar comprising a second bus bar end portion welded to a joint end portion of one of the segment conductors that constitutes the power point of the second phase winding, and a third power bus bar comprising a third bus bar end portion welded to a joint end portion of one of the segment conductors that constitutes the power point of the third phase winding, wherein the bus bar end portion of the neutral bus bar comprises a fourth bus bar end portion welded to a joint end portion of one of the segment conductors that constitutes the neutral point of the first phase winding, a fifth bus bar end portion welded to a joint end portion of one of the segment conductors that constitutes the neutral point of the second phase winding, and a sixth bus bar end portion welded to a joint end portion of one of the segment conductors that constitutes the neutral point of the third phase winding, and wherein one or more of the first bus bar end portion, the second bus bar end portion, the third bus bar end portion, the fourth bus bar end portion, the fifth bus bar end portion and the sixth bus bar end portion are located on an inner side, in the radial direction of the stator core, of the joint end portion of the segment conductor to which the one or more of the first bus bar end portion, the second bus bar end portion, the third bus bar end portion, the fourth bus bar end portion, the fifth bus bar end portion and the sixth bus bar end portion are welded.

5. The rotary electric machine comprising the stator according to claim 1, wherein a second inclined surface is formed on a second corner of the bus bar joint portion.

6. The stator according to claim 1, wherein the inclined surface is formed on the joint end portion of one of the segment conductors, and a second inclined surface is formed on one of the bus bar end portions.

7. A stator for a rotary electric machine, the stator comprising:

a stator core having a hollow cylindrical shape, the stator core including slots;

a stator winding comprising segment conductors inserted in the slots, the stator winding comprising a power point and a neutral point that protrude from an end surface of the stator core;

a power bus bar comprising a bus bar end portion welded to a joint end portion of one of the segment conductors that constitutes the power point of the stator winding; and a neutral bus bar comprising a bus bar end portion welded to a joint end portion of one of the segment conductors that constitutes the neutral point of the stator winding, wherein one or each of the bus bar end portion of the power bus bar and the bus bar end portion of the neutral bus bar is located on an inner side, in a radial direction of the stator core, of the joint end portion of one of the segment conductors to which the one or each of the bus bar end portion of the power bus bar and the bus bar end portion of the neutral bus bar is welded, wherein inclined surface are formed respectively on respective corners of bus bar joint portions, the bus bar joint portions respectively comprising the bus bar end portion of the power bus bar and the joint end portion to which the bus bar end portion of the power bus bar is welded, and the bus bar end portion of the neutral bus bar and the joint end portion to which the bus bar end portion of the neutral bus bar is welded.

8. The stator according to claim 7, wherein welding marks are formed on respective distal ends of the bus bar joint portions.

9. The stator according to claim 7, wherein the stator winding comprises a first phase winding comprising segment conductors inserted in the slots, the first phase winding comprising a power point and a neutral point that protrude from the end surface of the stator core, a second phase winding comprising segment conductors inserted in the slots, the second phase winding comprising a power point and a neutral point that protrude from the end surface of the stator core, and a third phase winding comprising segment conductors inserted in the slots, the third phase winding comprising a power point and a neutral point that protrude from the end surface of the stator core, wherein the power bus bar comprises a first power bus bar comprising a first bus bar end portion welded to a joint end portion of one of the segment conductors that constitutes the power point of the first phase winding, a second power bus bar comprising a second bus bar end portion welded to a joint end portion of one of the segment conductors that constitutes the power point of the second phase winding, and a third power bus bar comprising a third bus bar end portion welded to a joint end portion of one of the segment conductors that constitutes the power point of the third phase winding, wherein the bus bar end portion of the neutral bus bar comprises a fourth bus bar end portion welded to a joint end portion of one of the segment conductors that constitutes the neutral point of the first phase winding, a fifth bus bar end portion welded to a joint end portion of one of the segment conductors that constitutes the neutral point of the second phase winding, and a sixth bus bar end portion welded to a joint end portion of one of the segment conductors that constitutes the neutral point of the third phase winding, and wherein one or more of the first bus bar end portion, the second bus bar end portion, the third bus bar end portion, the fourth bus bar end portion, the fifth bus bar end portion and the sixth bus bar end portion are located on an inner side, in the radial direction of the stator core, of the joint end portion of the segment conductor to which the one or more of the first bus bar end portion, the second bus bar end portion, the third bus bar end portion, the fourth bus bar end portion, the fifth bus bar end portion and the sixth bus bar end portion are welded.

10. The stator according to claim 8, wherein the stator winding comprises a first phase winding comprising segment conductors inserted in the slots, the first phase winding comprising a power point and a neutral point that protrude from the end surface of the stator core, a second phase winding comprising segment conductors inserted in the slots, the second phase winding comprising a power point and a neutral point that protrude from the end surface of the stator core, and a third phase winding comprising segment conductors inserted in the slots, the third phase winding comprising a power point and a neutral point that protrude from the end surface of the stator core, wherein the power bus bar comprises a first power bus bar comprising a first bus bar end portion welded to a joint end portion of one of the segment conductors that constitutes the power point of the first phase winding,
a second power bus bar comprising a second bus bar end portion welded to a joint end portion of one of the segment conductors that constitutes the power point of the second phase winding, and
a third power bus bar comprising a third bus bar end portion welded to a joint end portion of one of the segment conductors that constitutes the power point of the third phase winding,
wherein the bus bar end portion of the neutral bus bar comprises
a fourth bus bar end portion welded to a joint end portion of one of the segment conductors that constitutes the neutral point of the first phase winding,
a fifth bus bar end portion welded to a joint end portion of one of the segment conductors that constitutes the neutral point of the second phase winding, and
a sixth bus bar end portion welded to a joint end portion of one of the segment conductors that constitutes the neutral point of the third phase winding, and
wherein one or more of the first bus bar end portion, the second bus bar end portion, the third bus bar end portion, the fourth bus bar end portion, the fifth bus bar end portion and the sixth bus bar end portion are located on an inner side, in the radial direction of the stator core, of the joint end portion of the segment conductor to which the one or more of the first bus bar end portion, the second bus bar end portion, the third bus bar end portion, the fourth bus bar end portion, the fifth bus bar end portion and the sixth bus bar end portion are welded.

11. A stator comprising:
a stator core including slots;
a stator winding comprising segment conductors inserted in the slots, the stator winding comprising a power point and a neutral point that protrude from an end surface of the stator core;
a power bus bar comprising a bus bar end portion coupled to a joint end portion of one of the segment conductors including an inclined surface on a corner of bus bar joint portion comprising the bus bar end portion of the power bus bar and the joint end portion to which the bus bar end portion of the power bus bar is welded, that constitutes the power point of the stator winding; and
a neutral bus bar comprising a bus bar end portion coupled to a joint end portion of one of the segment conductors that constitutes the neutral point of the stator winding, wherein
one or each of the bus bar end portion of the power bus bar and the bus bar end portion of the neutral bus bar is located on an inner side, in a radial direction of the stator core, of the joint end portion of one of the segment conductors to which the one or each of the bus bar end portion of the power bus bar and the bus bar end portion of the neutral bus bar is coupled.

12. The stator according to claim 11, wherein the inclined surfaces are formed respectively on respective corners of bus bar joint portions, the bus bar joint portions respectively comprising the bus bar end portion of the power bus bar and the joint end portion to which the bus bar end portion of the power bus bar is coupled, and the bus bar end portion of the neutral bus bar and the joint end portion to which the bus bar end portion of the neutral bus bar is coupled.

13. The stator according to claim 11, wherein coupling points are located on respective distal ends of bus bar joint portions, the bus bar joint portions respectively comprising the bus bar end portion of the power bus bar and the joint end portion to which the bus bar end portion of the power bus bar is coupled, and the bus bar end portion of the neutral bus bar and the joint end portion to which the bus bar end portion of the neutral bus bar is coupled.

14. The stator according to claim 12, wherein coupling points are located on respective distal ends of the bus bar joint portions.

15. The stator according to claim 11,
wherein the stator winding comprises:
a first phase winding comprising segment conductors inserted in the slots, the first phase winding comprising a power point and a neutral point that protrude from the end surface of the stator core,
a second phase winding comprising segment conductors inserted in the slots, the second phase winding comprising a power point and a neutral point that protrude from the end surface of the stator core, and
a third phase winding comprising segment conductors inserted in the slots, the third phase winding comprising a power point and a neutral point that protrude from the end surface of the stator core.

16. The stator according to claim 12,
wherein the stator winding comprises:
a first phase winding comprising segment conductors inserted in the slots, the first phase winding comprising a power point and a neutral point that protrude from the end surface of the stator core,
a second phase winding comprising segment conductors inserted in the slots, the second phase winding comprising a power point and a neutral point that protrude from the end surface of the stator core, and
a third phase winding comprising segment conductors inserted in the slots, the third phase winding comprising a power point and a neutral point that protrude from the end surface of the stator core.

17. The stator according to claim 13,
wherein the stator winding comprises:
a first phase winding comprising segment conductors inserted in the slots, the first phase winding comprising a power point and a neutral point that protrude from the end surface of the stator core,
a second phase winding comprising segment conductors inserted in the slots, the second phase winding comprising a power point and a neutral point that protrude from the end surface of the stator core, and
a third phase winding comprising segment conductors inserted in the slots, the third phase winding comprising a power point and a neutral point that protrude from the end surface of the stator core.

18. The stator according to claim 14,
wherein the stator winding comprises:
a first phase winding comprising segment conductors inserted in the slots, the first phase winding comprising a power point and a neutral point that protrude from the end surface of the stator core,
a second phase winding comprising segment conductors inserted in the slots, the second phase winding comprising a power point and a neutral point that protrude from the end surface of the stator core, and
a third phase winding comprising segment conductors inserted in the slots, the third phase winding comprising a power point and a neutral point that protrude from the end surface of the stator core.

19. The stator according to claim 11, wherein the inclined surface is formed on the joint end portion of one of the segment conductors, and a second inclined surface is formed on one of the bus bar end portions.

20. A rotary electric machine comprising the stator according to claim 11.

* * * * *